(12) United States Patent
Griepentrog

(10) Patent No.: US 6,979,209 B2
(45) Date of Patent: Dec. 27, 2005

(54) BIASED UTILITY RECEPTACLE ASSEMBLY

(75) Inventor: Dennis G. Griepentrog, DePere, WI (US)

(73) Assignee: Krueger International, Inc., Green Bay, WI (US)

( * ) Notice: Subject to any disclaimer, the term of this patent is extended or adjusted under 35 U.S.C. 154(b) by 0 days.

(21) Appl. No.: 10/766,361

(22) Filed: Jan. 28, 2004

(65) Prior Publication Data
US 2004/0147147 A1   Jul. 29, 2004

Related U.S. Application Data

(60) Provisional application No. 60/443,254, filed on Jan. 29, 2003.

(51) Int. Cl.[7] .................. H01R 13/44; H01R 13/60
(52) U.S. Cl. ............................. 439/131; 174/57
(58) Field of Search .................. 439/131, 132; 174/48, 57

(56) References Cited

U.S. PATENT DOCUMENTS

| | | |
|---|---|---|
| 3,131,512 A | 5/1964 | MacLeod, Jr. |
| 3,433,886 A | 3/1969 | Myers |
| 3,646,244 A | 2/1972 | Cole |
| 3,794,956 A | 2/1974 | Dubreuil |
| 3,876,006 A | 4/1975 | Messenger |
| 3,972,579 A | 8/1976 | Kohaut |
| 4,296,981 A | 10/1981 | Hildebrandt et al. |
| 4,372,629 A | 2/1983 | Propst et al. |
| 4,511,198 A | 4/1985 | Mitchell et al. |
| 4,551,577 A | 11/1985 | Byrne |
| 4,747,788 A | 5/1988 | Byrne |
| 4,792,881 A | 12/1988 | Wilson et al. |
| 4,838,175 A | 6/1989 | Hauville |
| 4,950,839 A | 8/1990 | Quinn et al. |
| 4,967,041 A | 10/1990 | Bowman |
| 4,984,982 A | 1/1991 | Brownlie et al. |
| 5,003,130 A | 3/1991 | Danforth et al. |
| 5,023,396 A | 6/1991 | Bartee et al. |
| 5,050,267 A | 9/1991 | Quest |
| 5,108,053 A | 4/1992 | Biederstedt |
| 5,108,122 A | 4/1992 | Beagley |
| 5,119,966 A | 6/1992 | McKim et al. |
| 5,179,252 A | 1/1993 | Yang |
| 5,195,900 A | 3/1993 | Kamagai et al. |
| 5,211,706 A | 5/1993 | Polgar |

(Continued)

FOREIGN PATENT DOCUMENTS

| | | |
|---|---|---|
| DE | 2916002 | 11/1980 |

(Continued)

*Primary Examiner*—Hae Moon Hyeon
(74) *Attorney, Agent, or Firm*—Boyle, Fredrickson, Newholm, Stein & Gratz, S.C.

(57) ABSTRACT

A pivoting utility receptacle assembly for use with a work surface, such as a desktop. The assembly includes a base member positionable within an opening in the work surface and a receptacle member that is pivotally mounted to the base member. A biasing member is engaged between the receptacle member and the base member, and biases the receptacle member to a partially exposed position with respect to the base member. The assembly also has a locking mechanism including a latch on the receptacle member which engages the base member and secures the receptacle member in a closed position with respect to the base member until such time as it is desired to expose the receptacle member. The movement of the receptacle member out of the base member under the influence of the biasing member is controlled by a movement controlling assembly engaged between the receptacle member and the base member.

23 Claims, 25 Drawing Sheets

U.S. PATENT DOCUMENTS

| | | |
|---|---|---|
| 5,216,203 A | 6/1993 | Gower |
| 5,230,552 A | 7/1993 | Schipper et al. |
| 5,231,562 A | 7/1993 | Pierce et al. |
| 5,299,943 A | 4/1994 | Shieh |
| 5,337,447 A | 8/1994 | Tanaka et al. |
| 5,366,387 A | 11/1994 | Yamanshi |
| 5,709,156 A | 1/1998 | Gevaert et al. |
| 5,755,582 A * | 5/1998 | Charlton ............... 439/131 |
| D407,374 S | 3/1999 | Byrne |
| 5,931,103 A | 8/1999 | Huang |
| 6,028,267 A | 2/2000 | Byrne |
| 6,085,667 A | 7/2000 | Gevaert et al. |
| 6,290,518 B1 | 9/2001 | Byrne |
| 6,327,983 B1 | 12/2001 | Cronk et al. |
| 6,338,301 B1 | 1/2002 | Almond |
| 6,379,182 B1 | 4/2002 | Byrne |
| 6,397,762 B1 | 6/2002 | Goldberg et al. |
| 6,410,855 B1 | 6/2002 | Berkowitz et al. |
| 6,435,729 B1 * | 8/2002 | Thevenod et al. ............ 385/76 |

FOREIGN PATENT DOCUMENTS

| | | |
|---|---|---|
| EP | 0121644 | 4/1983 |
| EP | 0410588 | 1/1991 |
| EP | 0648001 | 4/1995 |
| GB | 1501875 | 2/1978 |
| GB | 2116781 | 9/1983 |
| GB | 2182640 | 5/1987 |
| GB | 2241389 | 8/1991 |
| GB | 2277206 | 10/1994 |
| WO | WO81/00965 | 4/1981 |

* cited by examiner

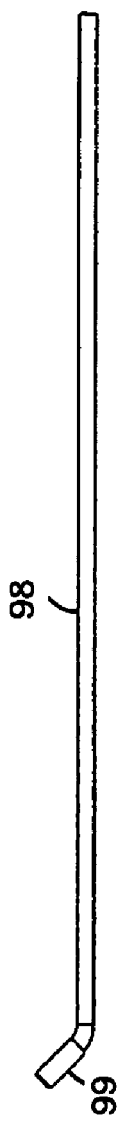
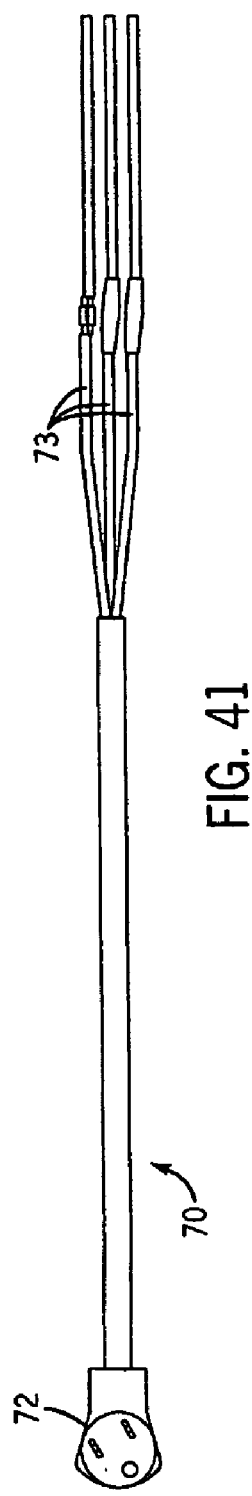
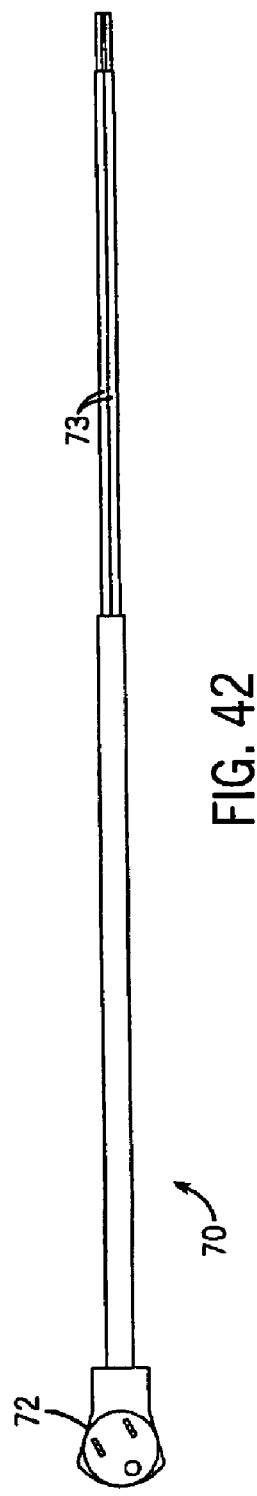
FIG. 39
FIG. 40
FIG. 41
FIG. 42

BIASED UTILITY RECEPTACLE ASSEMBLY

CROSS REFERENCE TO RELATED APPLICATIONS

This application claims priority from U.S. Provisional Patent Application Ser. No. 60/443,254, which was filed on Jan. 29, 2003.

FIELD OF THE INVENTION

The present invention relates to utility receptacles positioned on or within work surfaces, and more specifically to receptacles which are biased to an open position above the work surface and can be locked in a closed position below the work surface.

BACKGROUND OF THE INVENTION

In order to provide easy access to electric power or communication connections when utilizing a work surface, such as a table or a desk, many work surfaces have been designed to include utility receptacles on the work surface. These receptacles are sometimes disposed directly on an exposed surface of the work surface, or can be disposed in a hidden compartment located beneath the work surface. When the receptacle is mounted in a hidden manner, an individual can usually expose the receptacle by manually pivoting or otherwise moving a cover member away from the work surface to expose and use the receptacle.

A number of prior art receptacles have been designed that bias, such as by gravity, the receptacle into the closed position with a type of lock or other securing mechanism used to hold the receptacle open. Unfortunately, on many occasions the cover member used to conceal the receptacle cannot be reliably held in the open position when the receptacle is in use. Thus, the cover member and/or receptacle may inadvertently move to a closed position when the receptacle is in use, which causes inconvenience to the user and which may also result in damage and/or disengagement of a plug or other connector from the receptacle, as well as making it difficult for an individual to effectively utilize the receptacle.

Therefore, it is desirable to develop a receptacle assembly in which the cover member and receptacle can reliably be held in an open position to expose the receptacle when the receptacle is in use. Further, the cover member and receptacle should be able to be easily lowered from the open position and held in a closed position within the work surface in order to conceal the receptacle when desired.

SUMMARY OF THE INVENTION

According to a primary aspect of the present invention, a utility receptacle assembly includes a biasing member which operates to bias a cover member pivotally connected to the assembly to an open position in order to expose utility receptacles located directly beneath the cover member within the assembly. The biasing member effectively moves the cover member in a controlled manner to an open position upon the disengagement of a locking mechanism, which holds the cover member and the receptacles in a closed position against the bias of the biasing member until it is desired to expose the receptacles.

According to another aspect of the present invention, the biasing member used to hold the cover and receptacles in the exposed position includes components that enable the cover and receptacles to be exposed in a controlled manner. By controlling the rate at which the cover member and receptacles are exposed from within the work surface, the biasing member can prevent the inadvertent damaging of the cover and/or receptacles by repeatedly banging the cover and/or receptacles against the work surface as the cover and receptacles move from the closed position to the open position.

According to another aspect of the present invention, the locking mechanism has a simple construction that enables the assembly to be easily manufactured and installed in a work surface with a minimum of time and effort. Also, the construction of the locking mechanism securely holds the cover member and receptacles in a closed position until such time as it is desired to expose the receptacles.

Numerous additional aspects, features and advantages of the present invention will be made apparent from the following detailed description taken together with the drawing figures.

BRIEF DESCRIPTION OF THE DRAWINGS

The drawings illustrate the best mode currently contemplated of practicing the present invention.

In the drawings:

FIG. 1A is an isometric view of the assembly of FIG. 1 in an open position;

FIG. 39 is a front plan view of the pivot pin incorporated in the receptacle cover of FIG. 16;

FIG. 40 is a side elevation view of the pivot pin of FIG. 39;

FIG. 41 is a side elevation view of the power cord incorporated into the utility receptacle assembly of FIG. 1;

FIG. 42 is a top plan view of the power cord of FIG. 41;

DETAILED DESCRIPTION

Figure 1:
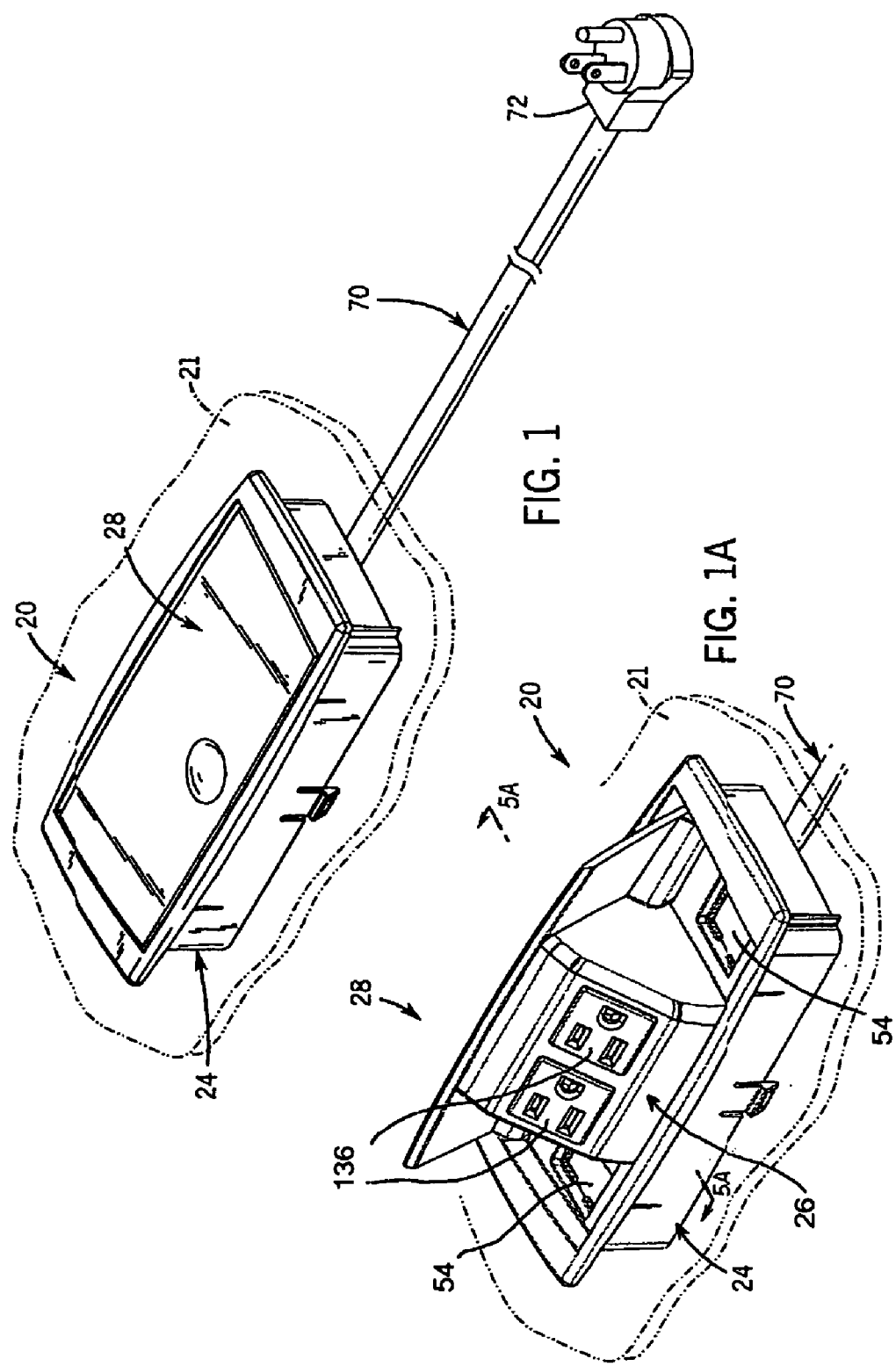
FIG. 1 is an isometric view of the utility receptacle assembly constructed according to the present invention.
Figure 2:
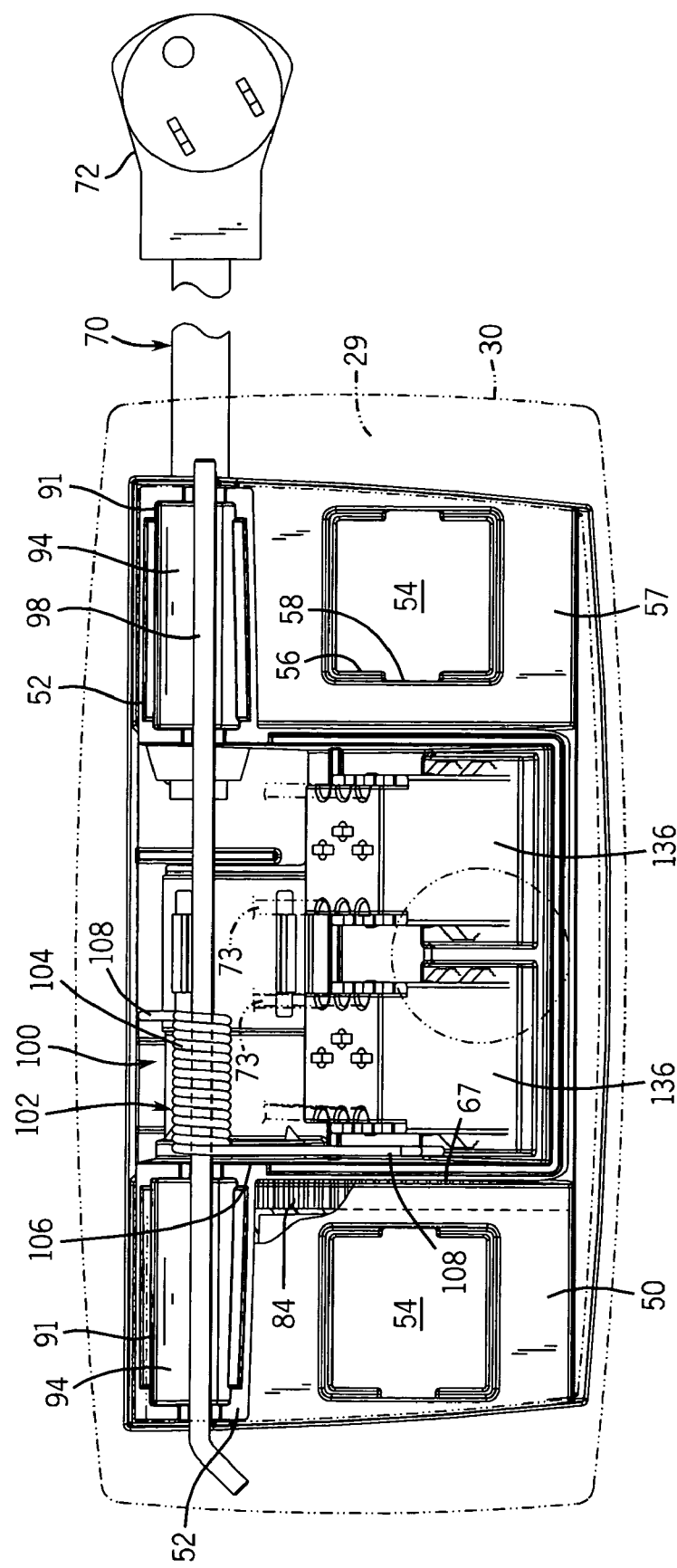
FIG. 2 is a partially broken away top plan view of the assembly of FIG. 1.
Figure 3:
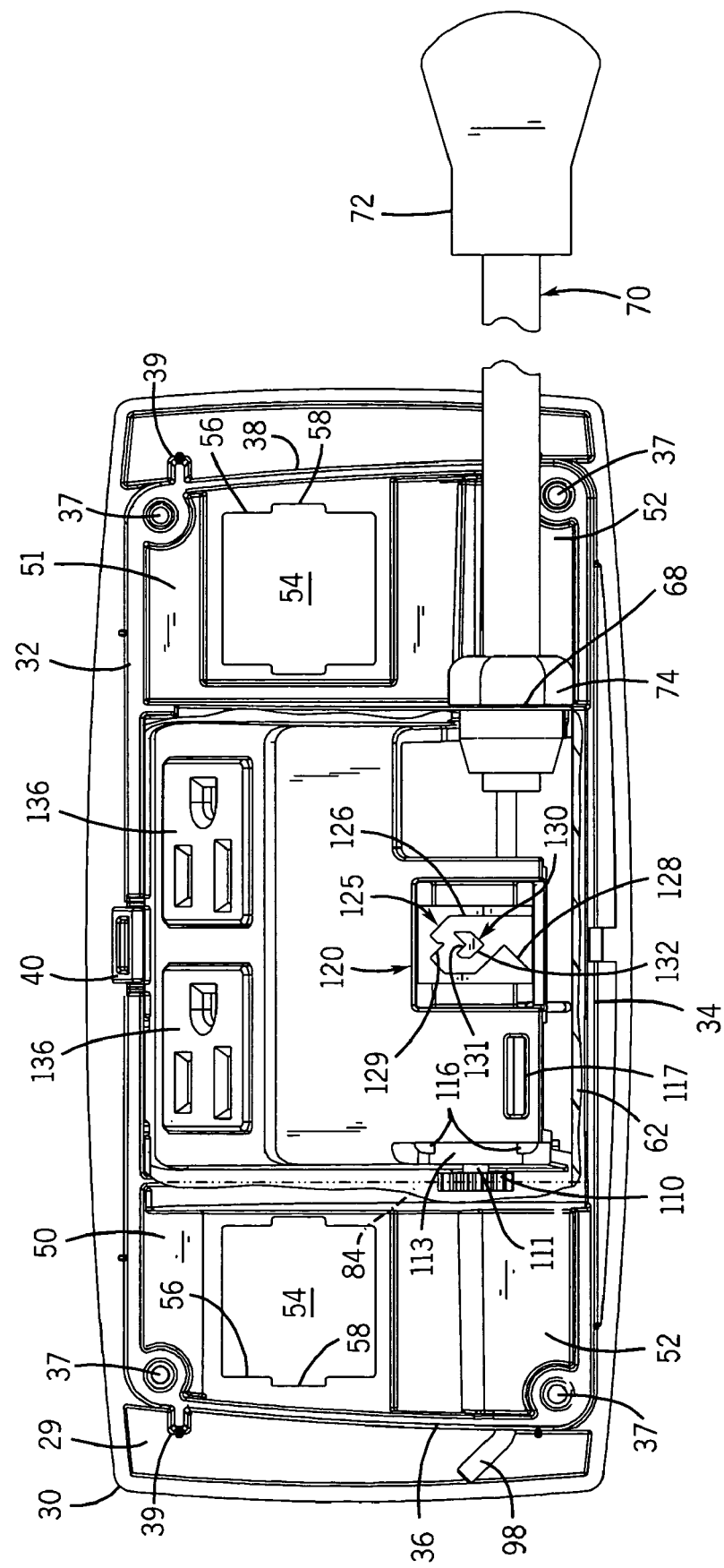
FIG. 3 is a partially broken away bottom plan view of the assembly of FIG. 1.
Figure 4:
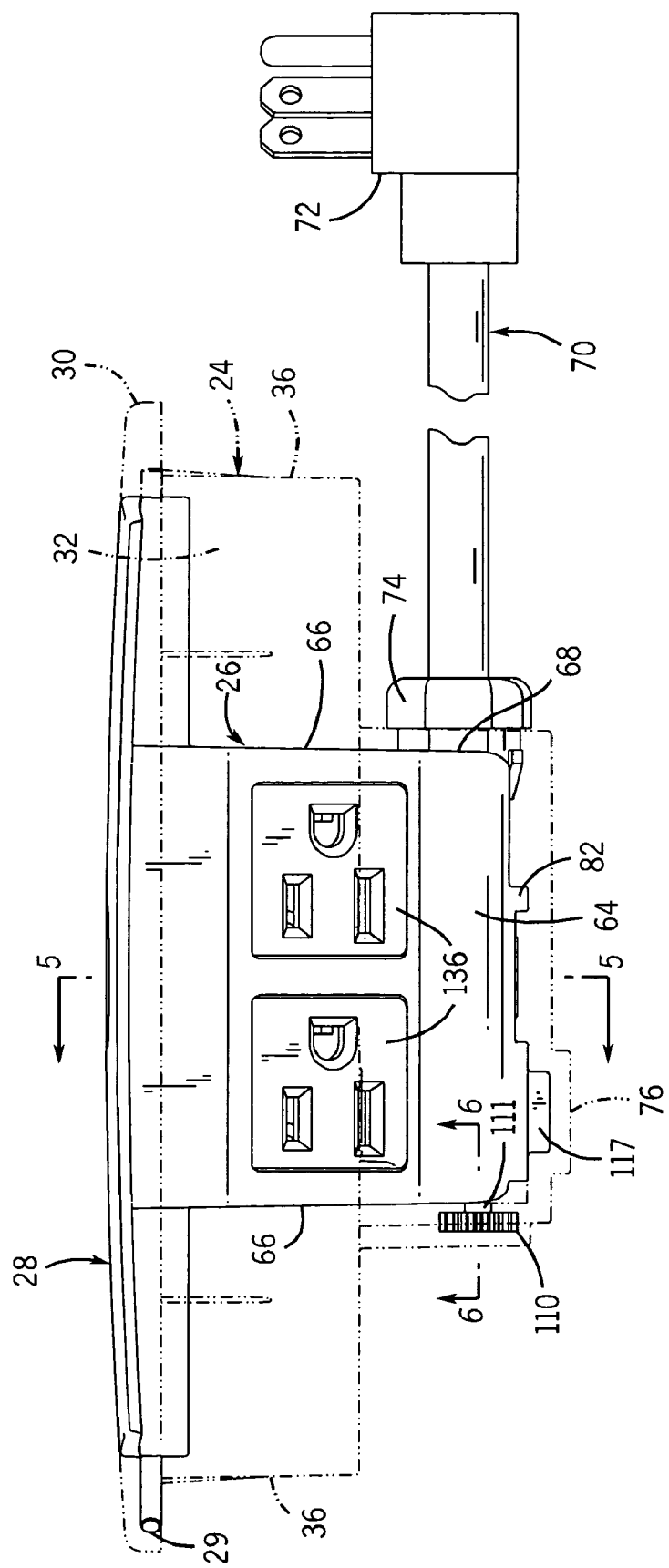
FIG. 4 is a partially broken away front elevation view of the assembly of FIG. 1.
Figure 5:
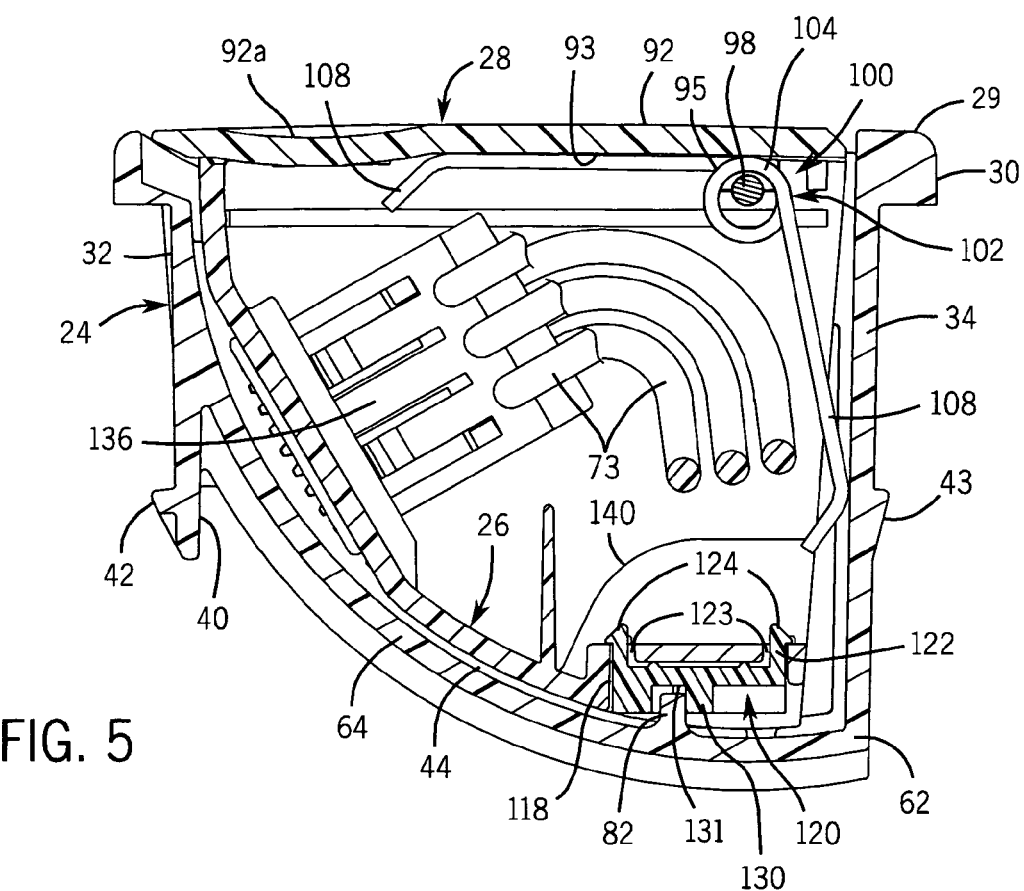
FIG. 5 is a cross-sectional view along line 5—5 of FIG. 4.
Figure 6:
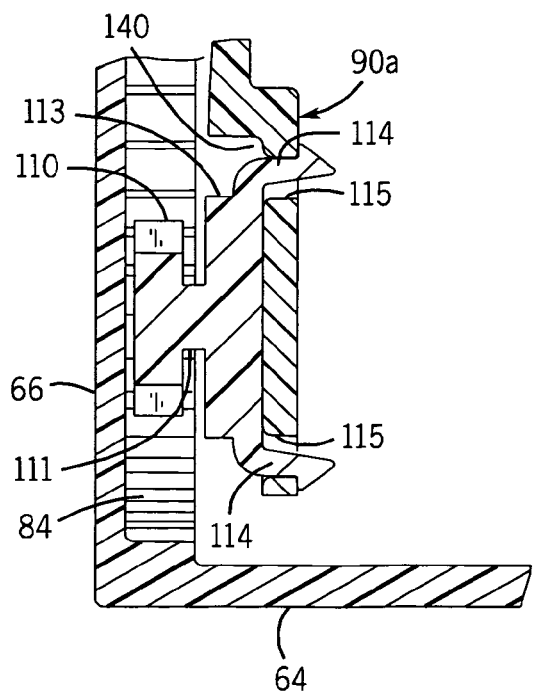
FIG. 6 is a partial cross-sectional view along line 6—6 of FIG. 4.
Figure 5A:
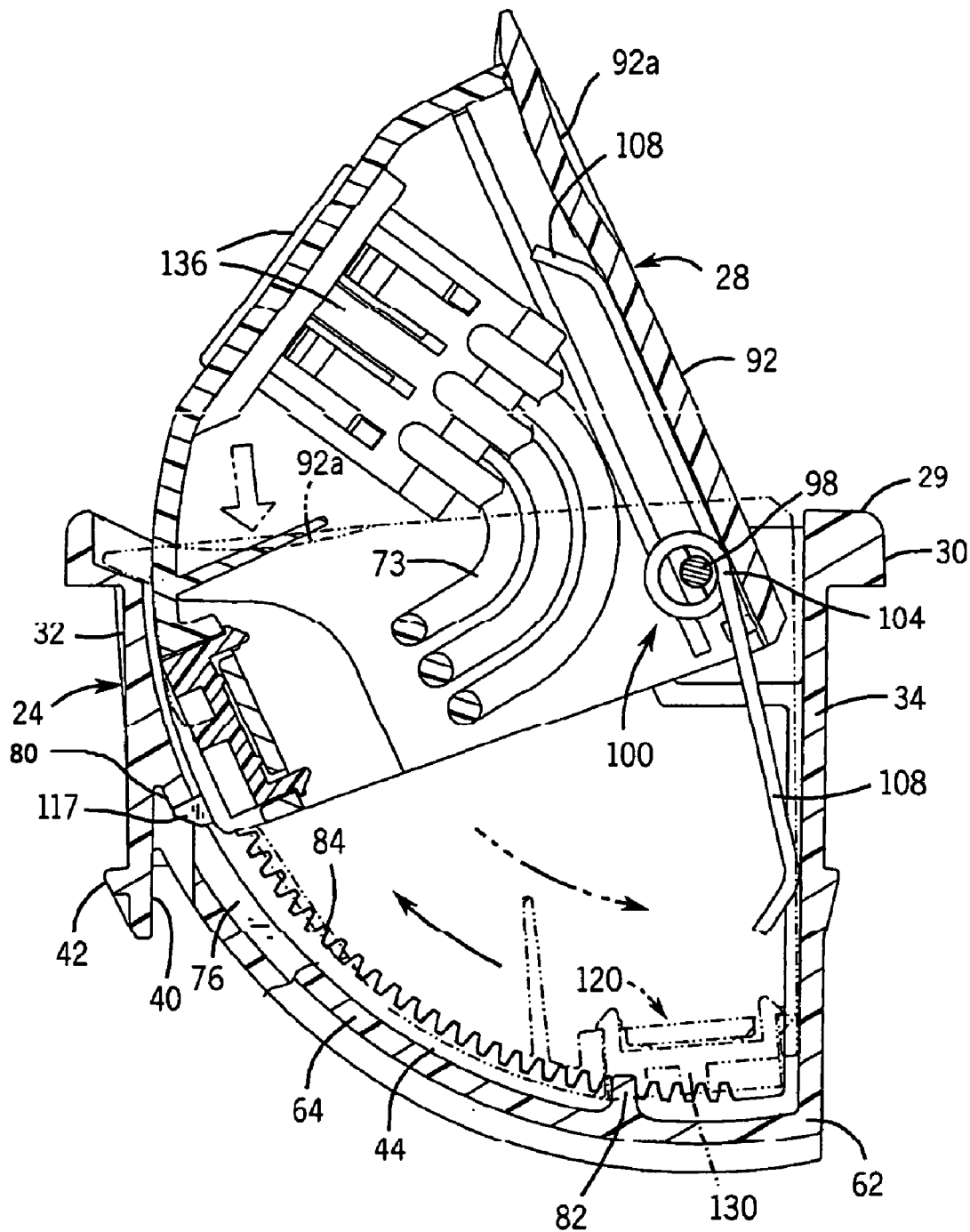
FIG. 5A is a cross-sectional view similar to FIG. 5 showing the assembly in an open position, with the assembly in a depressed position also shown in phantom.
Figure 7:
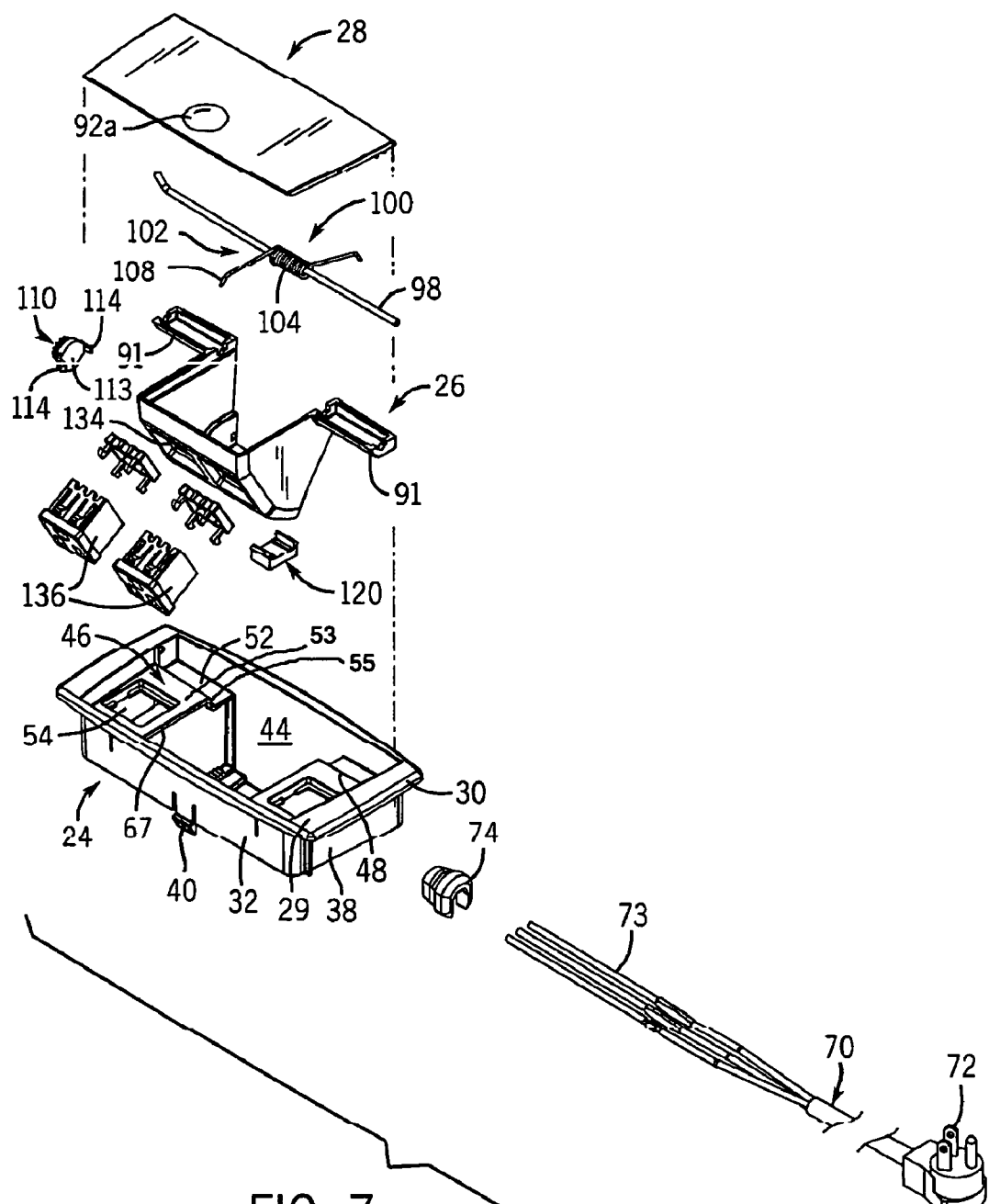
FIG. 7 is an exploded front isometric view of the assembly of FIG. 1.

With reference now to the drawing figures in which like reference numerals designate like parts throughout the disclosure, a utility receptacle assembly in accordance with the present invention is illustrated generally at 20 in FIGS. 1 and 1A. The assembly 20 is adapted for mounting within an opening formed in a support surface 21, which may be a desk top, tabletop or any other work surface or member where it is desired to provide selective access to power and/or communication receptacles. Generally, the utility receptacle assembly 20 includes a base member 24, a utility receptacle member 26 movably mounted to the base member 24, and a cover member 28 mounted to the utility receptacle member 26 in a manner to be explained.

The utility receptacle assembly 20 is movable between a closed or inoperative position as shown in FIG. 1, in which the receptacle member 26 is completely hidden within the base member 24, and an open or operative position as shown in FIG. 1a, in which the receptacle member 26 is partially exposed from within the base member 24.

Referring now to FIGS. 1–15, the base member 24 includes an upper wall 29 from which extends a peripheral lip 30. A pair of side walls 32 and 34 and a pair of end walls 36 and 38 extend downwardly from the underside of the upper wall 29. Each of the side walls 32 and 34 and end walls 36 and 38 are interconnected with each other at their respective ends to define a continuous peripheral wall structure. The intersection of each side wall 32 and 34 and each end wall 36 and 38 is formed with a tubular sleeve 37 therein which functions to increase the strength of the base member 24. Further, the end walls 36 and 38 have a pair of aligning ribs 39 located adjacent the side wall 32 to properly seat the base member 24 within the opening in the support surface. These ribs 39 may also be present adjacent the side wall 34, if desired.

A locking member 40 is formed integrally with the side wall 32 at its lower end, and includes a locking tab 42. The locking member 40 and locking tab 42 can be deflected with respect to the utility receptacle assembly 20 in order to engage locking member 40 with the underside of the support surface in order to securely engage the assembly 20 with the support surface. Alternatively, it is understood that any other satisfactory or conventionally known type of grommet mounting structure may be employed to secure the base member 24 and utility receptacle assembly 20 to the support surface.

The base member 24 further includes a central recess 44, and a pair of side recesses 46 and 48 disposed on opposite sides of the central recess 44. Side recesses 46 and 48 include upper surfaces 50 and 51, respectively, extending between the opposed side walls 32 and 34 and along one of the end walls 36 and 38, respectively. The upper surfaces 50 and 51 of side recesses 46 and 48, respectively, include a lower section 52 disposed adjacent the side wall 34 and an upper section 53 disposed adjacent the side wall 32, and joined to the lower section 52 by a sloped section 55. Each upper section 53 has a receptacle opening 54 that includes a pair of recessed and opposed inwardly extending peripheral ridges 56 separated by gaps 58 at their opposite ends. The pairs of ridges 56 provide support for any power, data or communication receptacle (not shown) that is configured to be engaged within one or both of openings 54. Further, disposed within each side wall 36 and 38 and located above each of the lower sections 52 is a generally circular pin bore 60 which extends completely through each of the end walls 36 and 38 and provides a function to be described.

Figure 8:
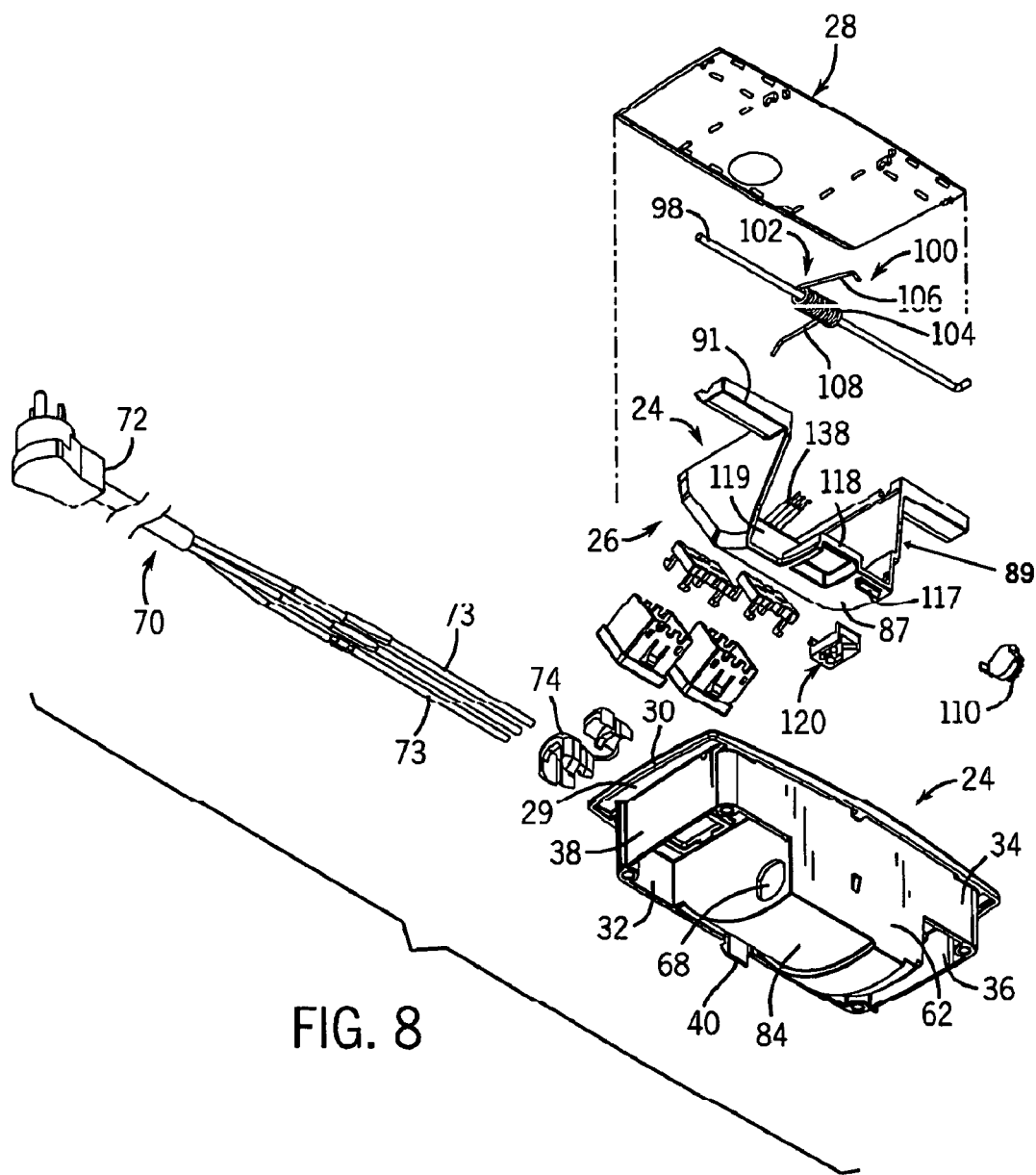
FIG. 8 is an exploded rear isometric view of the assembly of FIG. 1.
Figure 9:
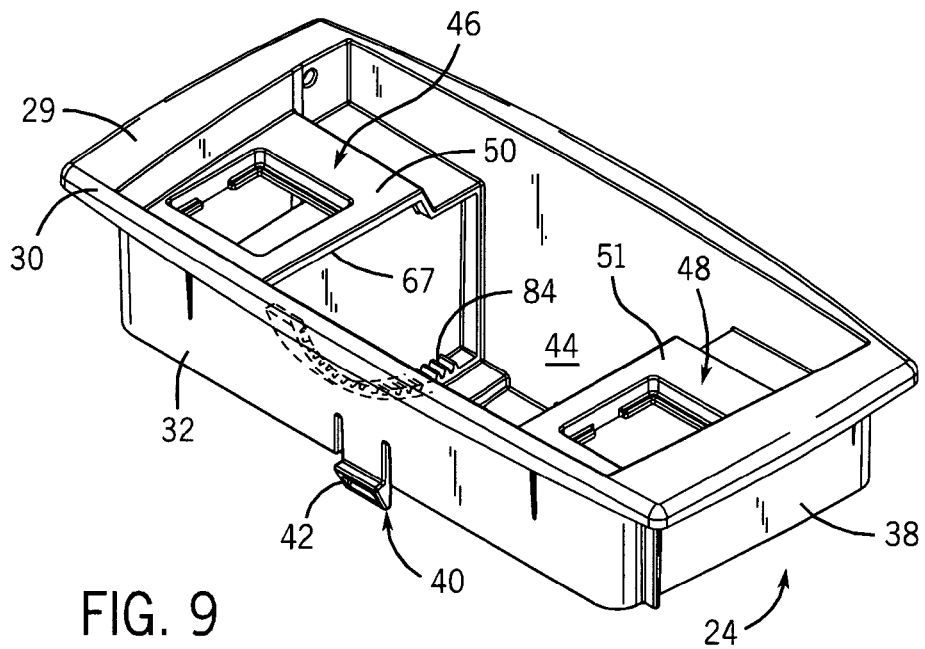
FIG. 9 is an isometric view of a base member of the utility receptacle assembly of FIG. 1.
Figure 10:
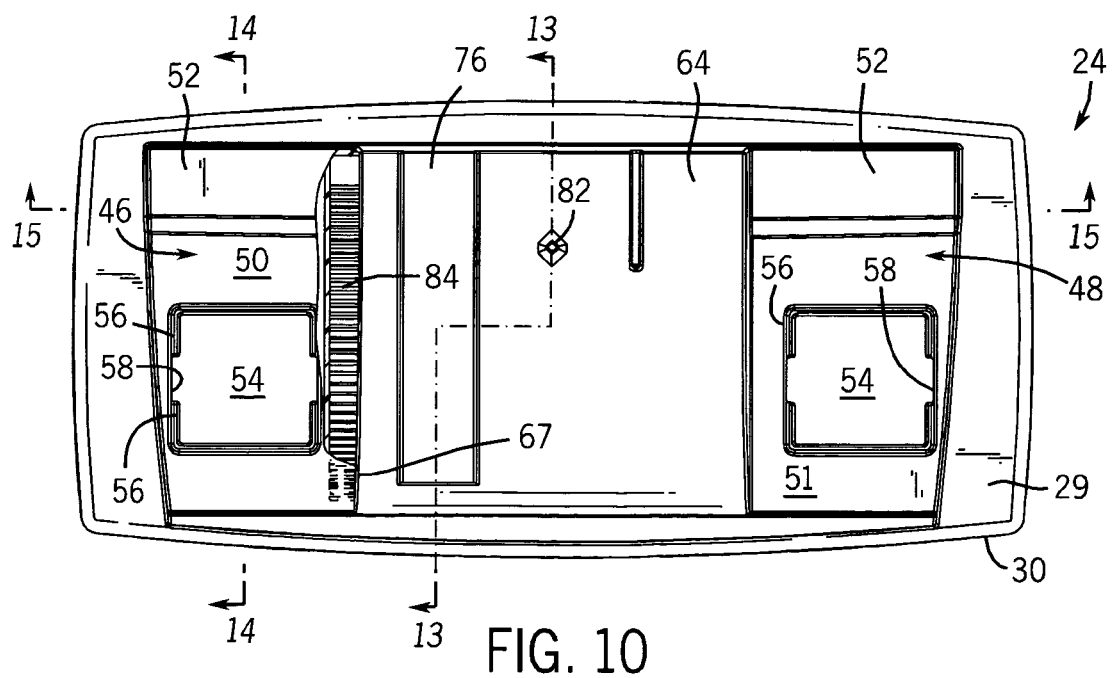
FIG. 10 is a top plan view of the base member of FIG. 9.
Figure 11:
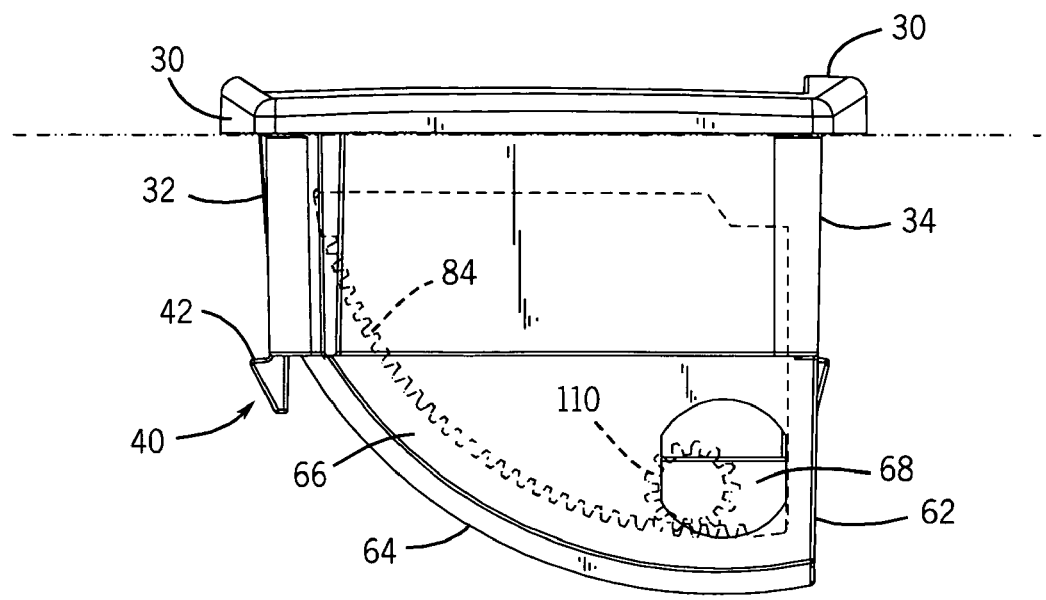
FIG. 11 is a right side elevation view of the base member of FIG. 9.
Figure 12:
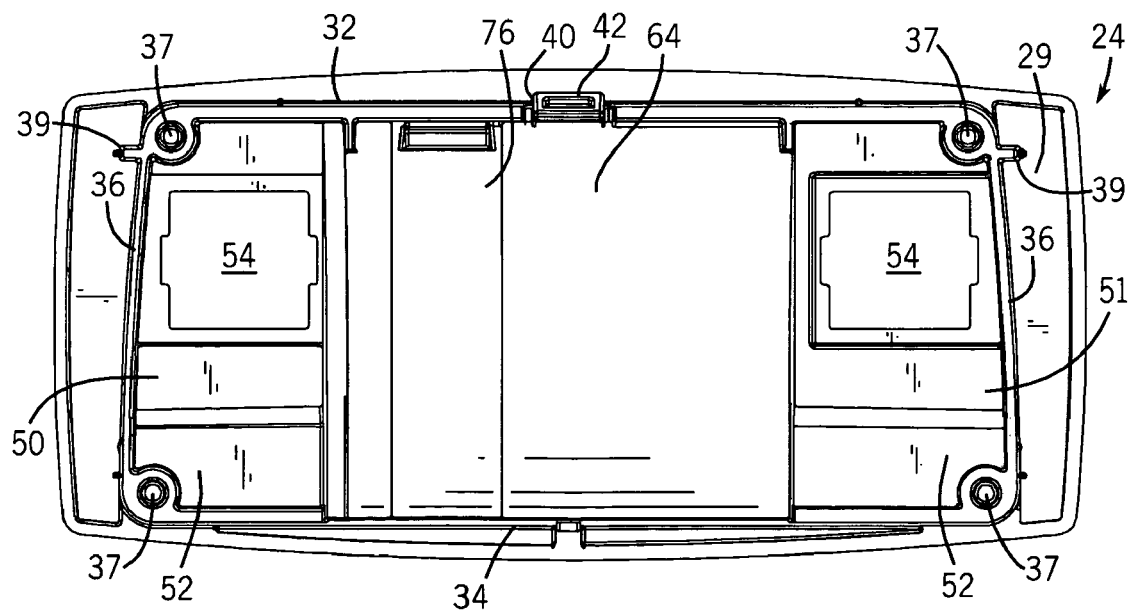
FIG. 12 is a bottom plan view of the base member of FIG. 9.
Figure 13:
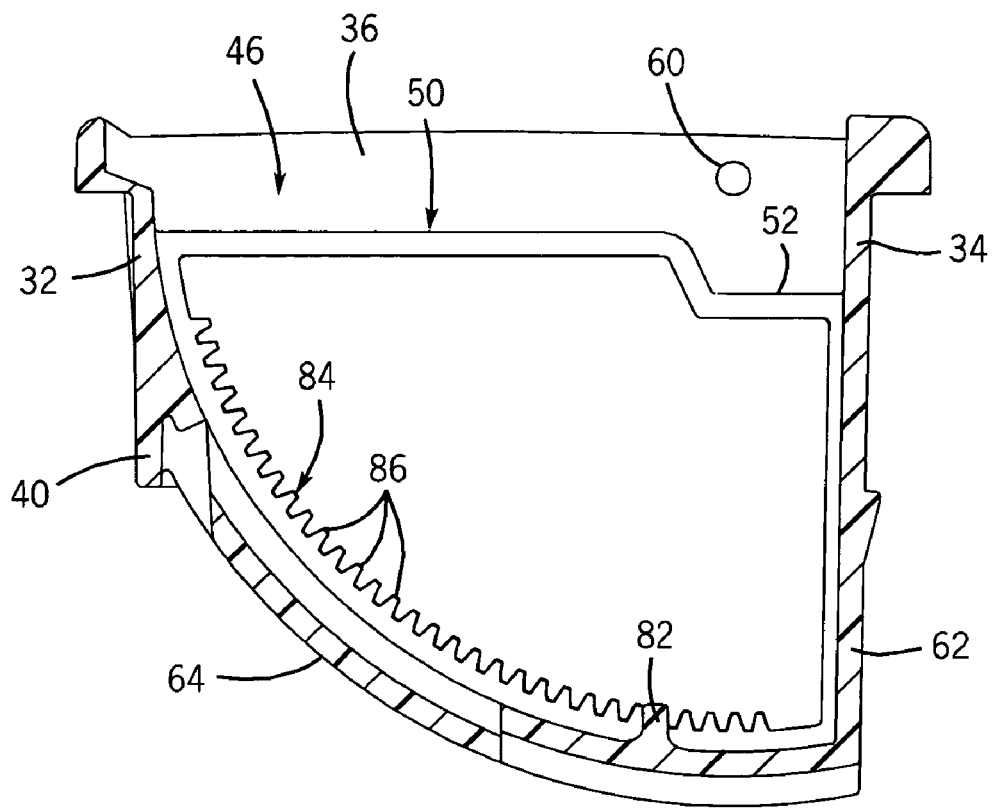
FIG. 13 is a cross-sectional view along line 13—13 of FIG. 10.
Figure 14:
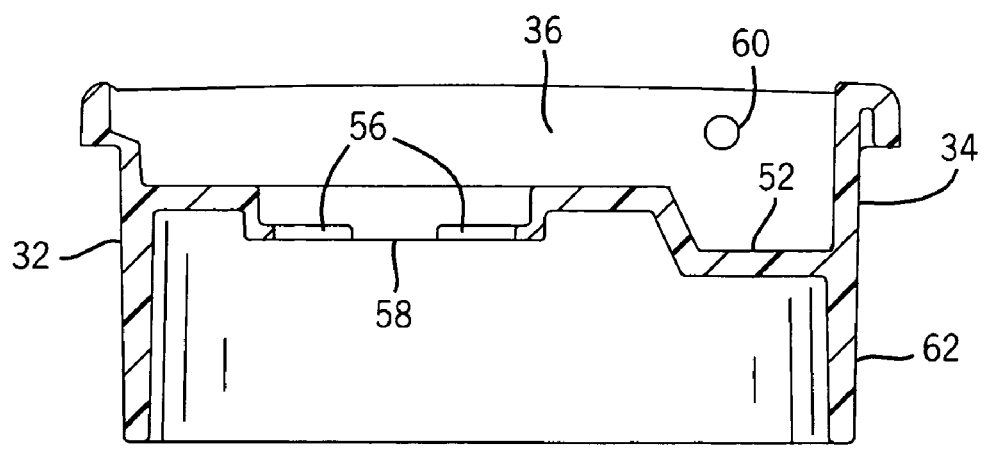
FIG. 14 is a cross-sectional view along line 14—14 of FIG. 10.
Figure 15:
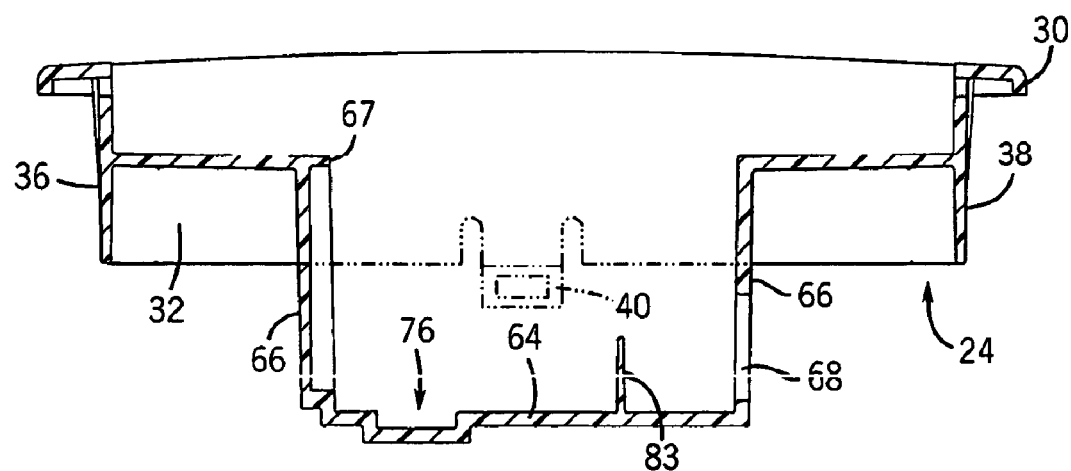
FIG. 15 is a cross-sectional view along line 15—15 of FIG. 10.
Figure 16:
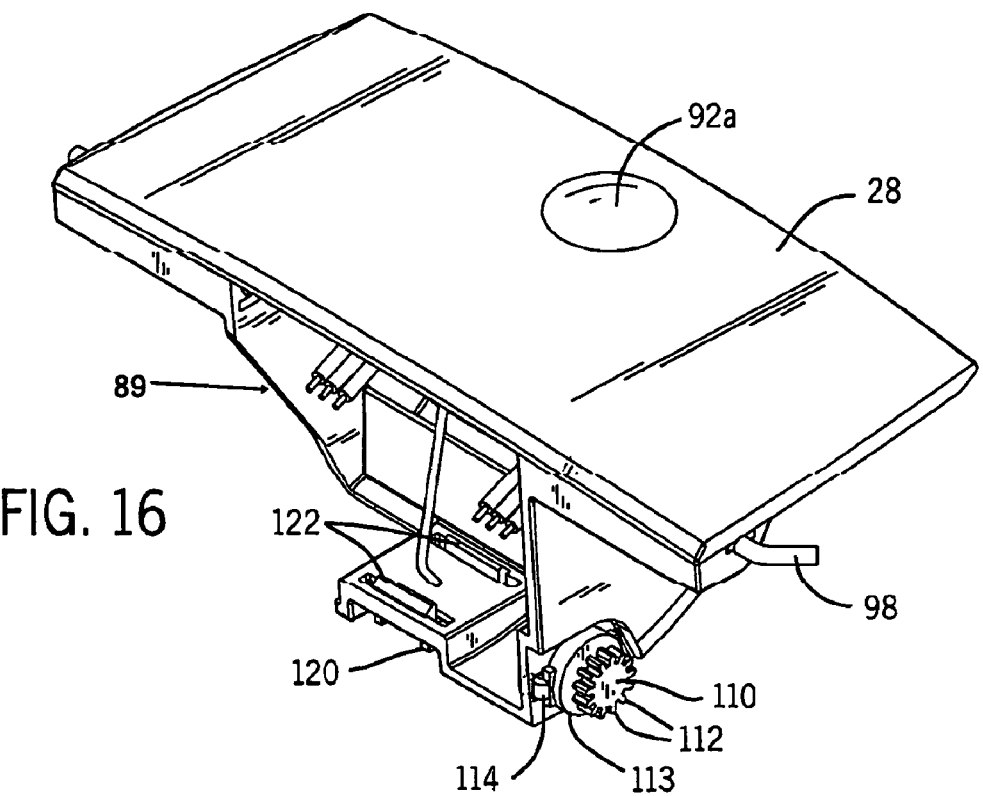
FIG. 16 is an isometric view of a receptacle cover of the utility receptacle assembly of FIG. 1.
Figure 17:
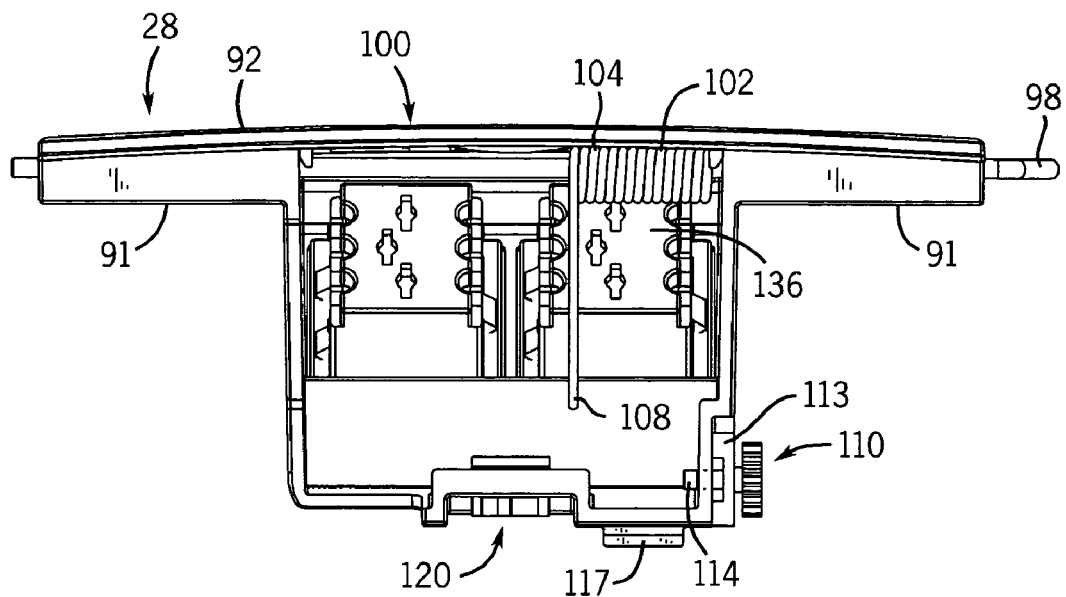
FIG. 17 is a rear elevation view of the receptacle cover of FIG. 16.
Figure 18:
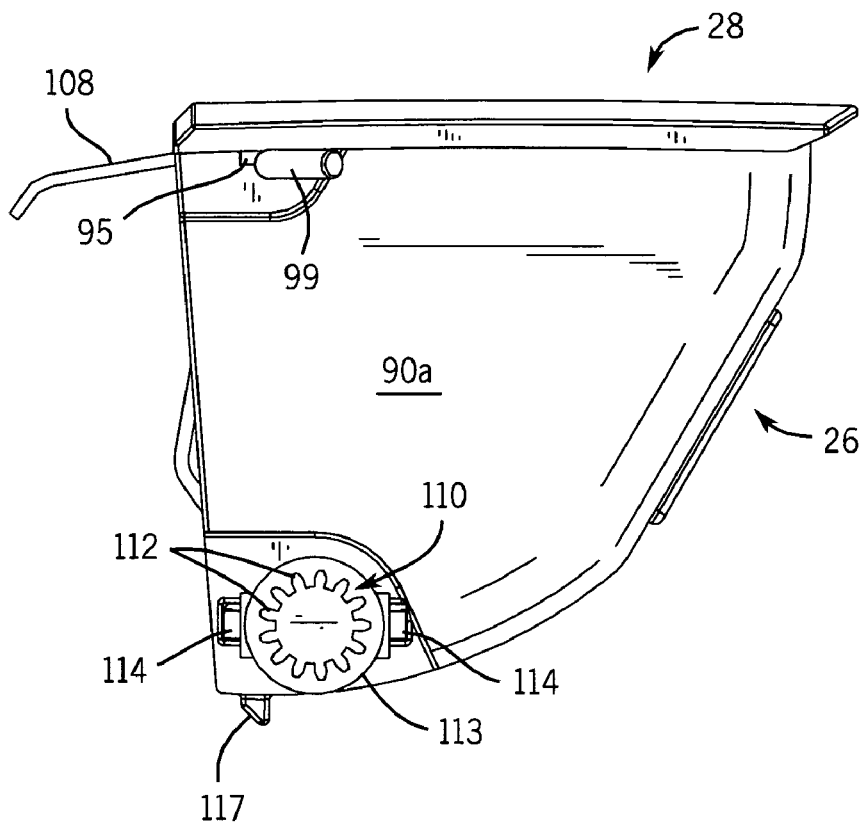
FIG. 18 is a left side elevation view of the receptacle cover of FIG. 16.
Figure 19:
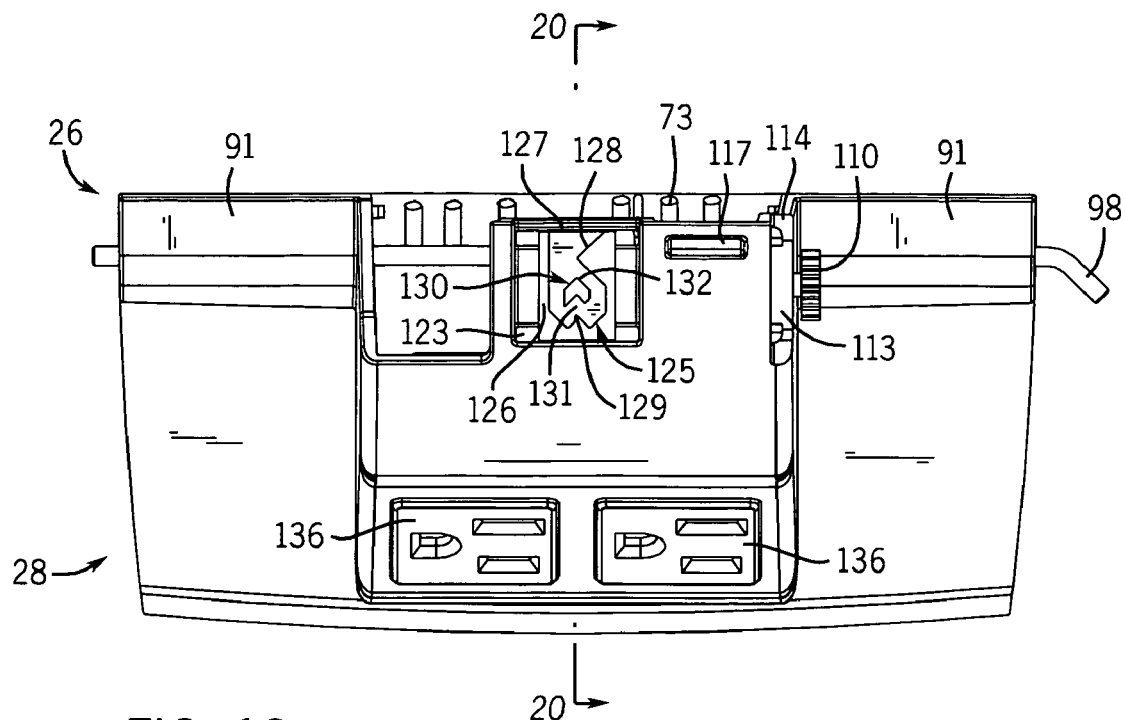
FIG. 19 is a bottom plan view of the receptacle cover of FIG. 16.
Figure 20:
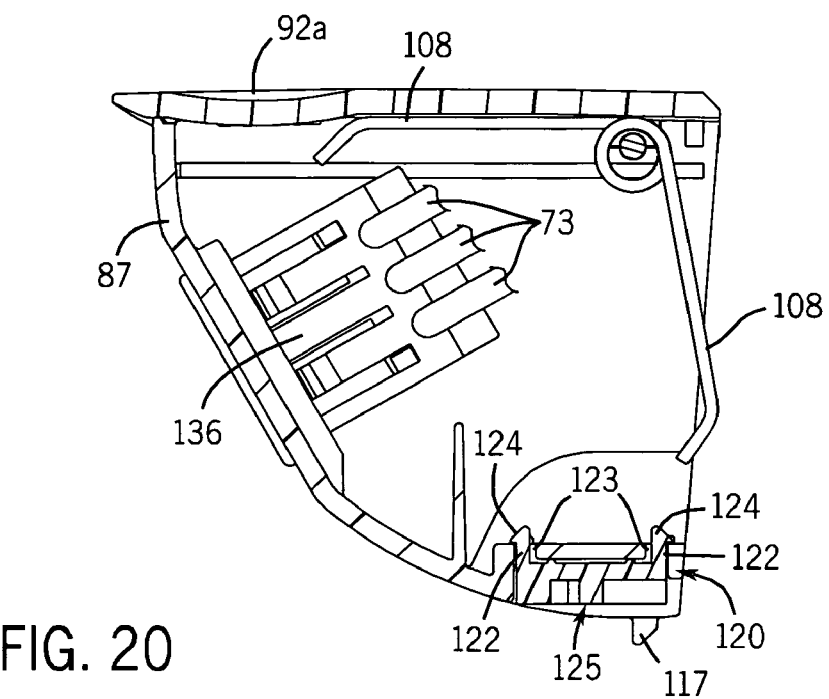
FIG. 20 is a cross-sectional view along line 20—20 of FIG. 19.
Figure 21:
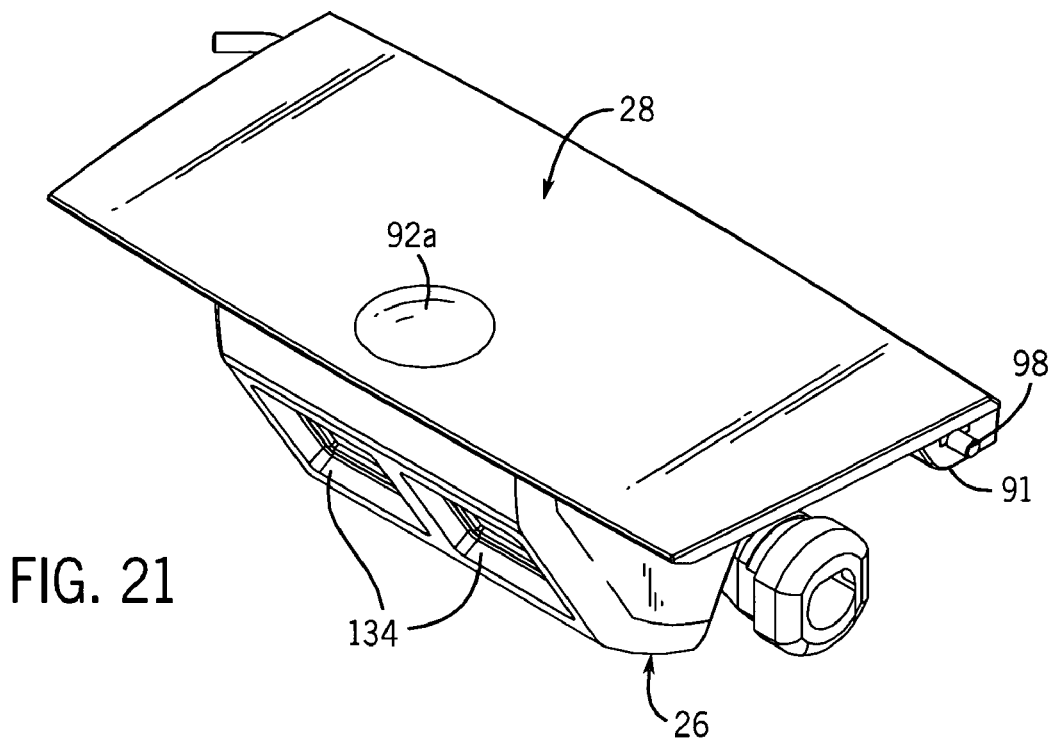
FIG. 21 an isometric view of the receptacle member and the cover member of the utility receptacle assembly of FIG. 1.
Figure 22:
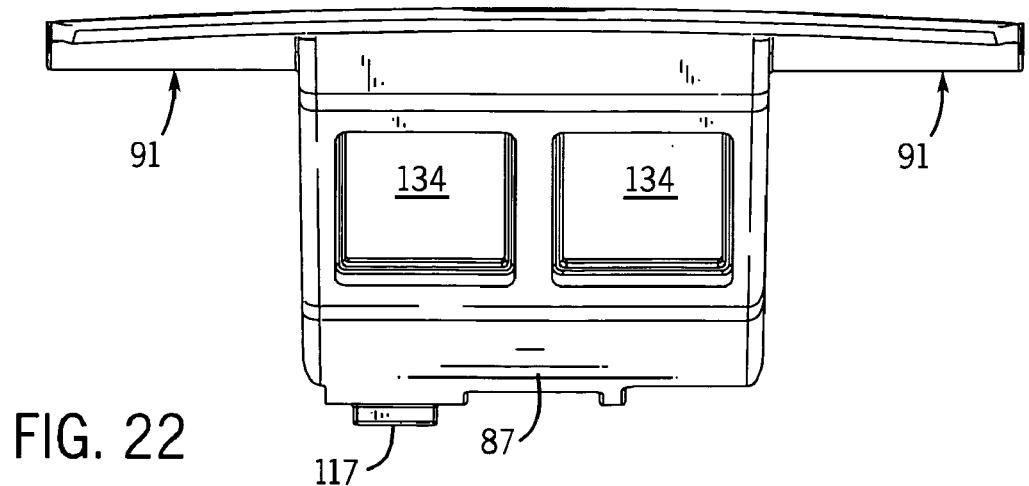
FIG. 22 is a front elevation view of the receptacle member and cover member of FIG. 21.
Figure 23:
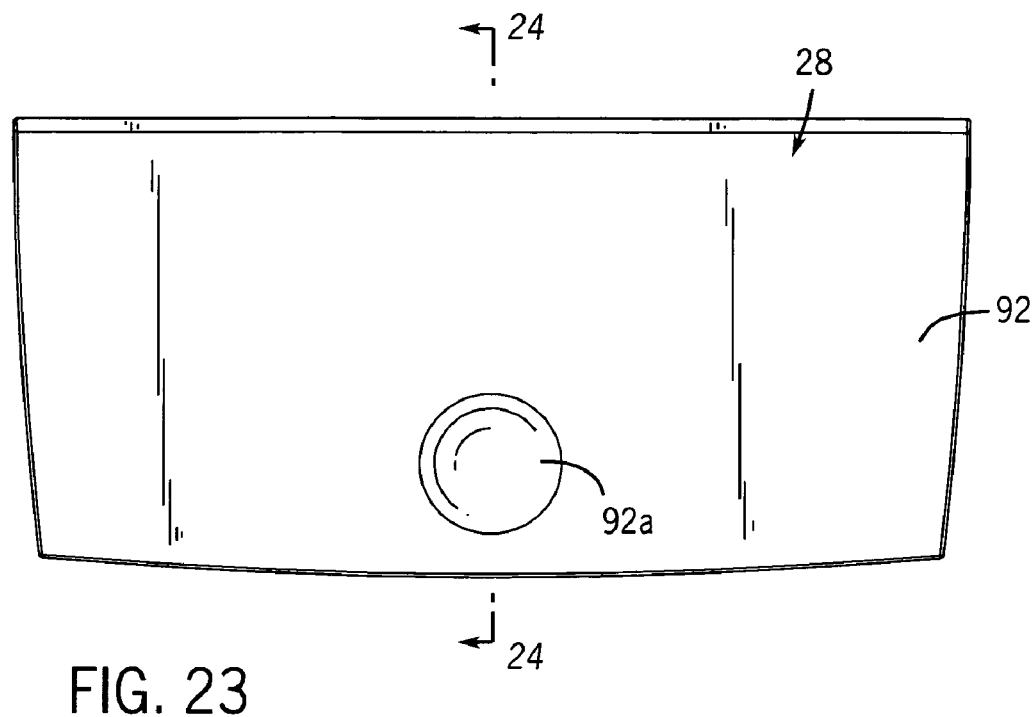
FIG. 23 is a top plan view of the receptacle member and cover member of FIG. 21.
Figure 24:
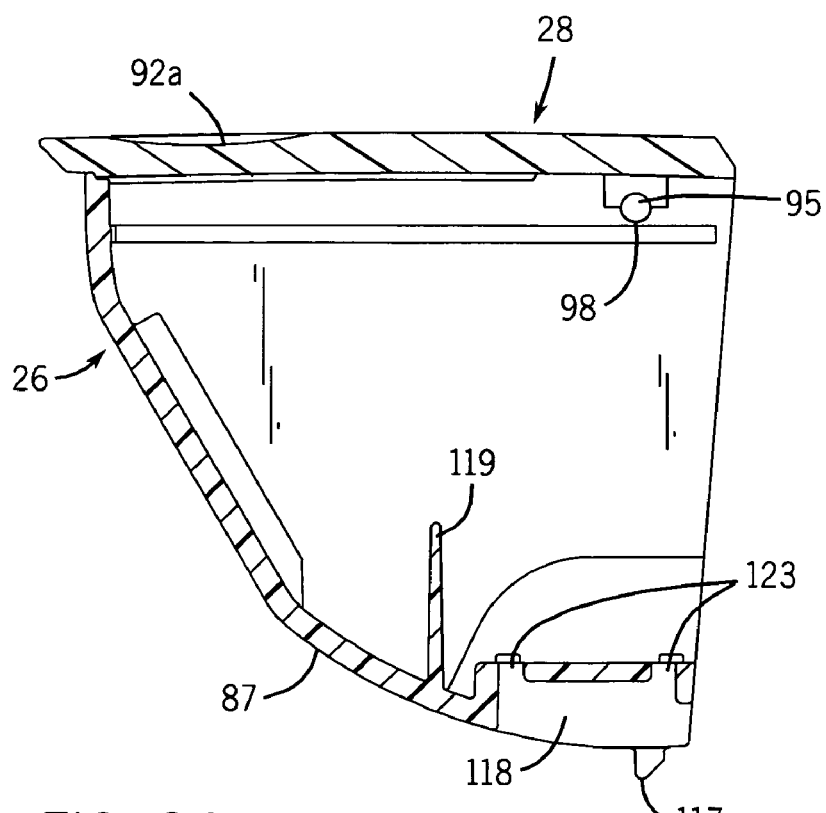
FIG. 24 is a cross-sectional view along line 24—24 of FIG. 23.
Figure 25:
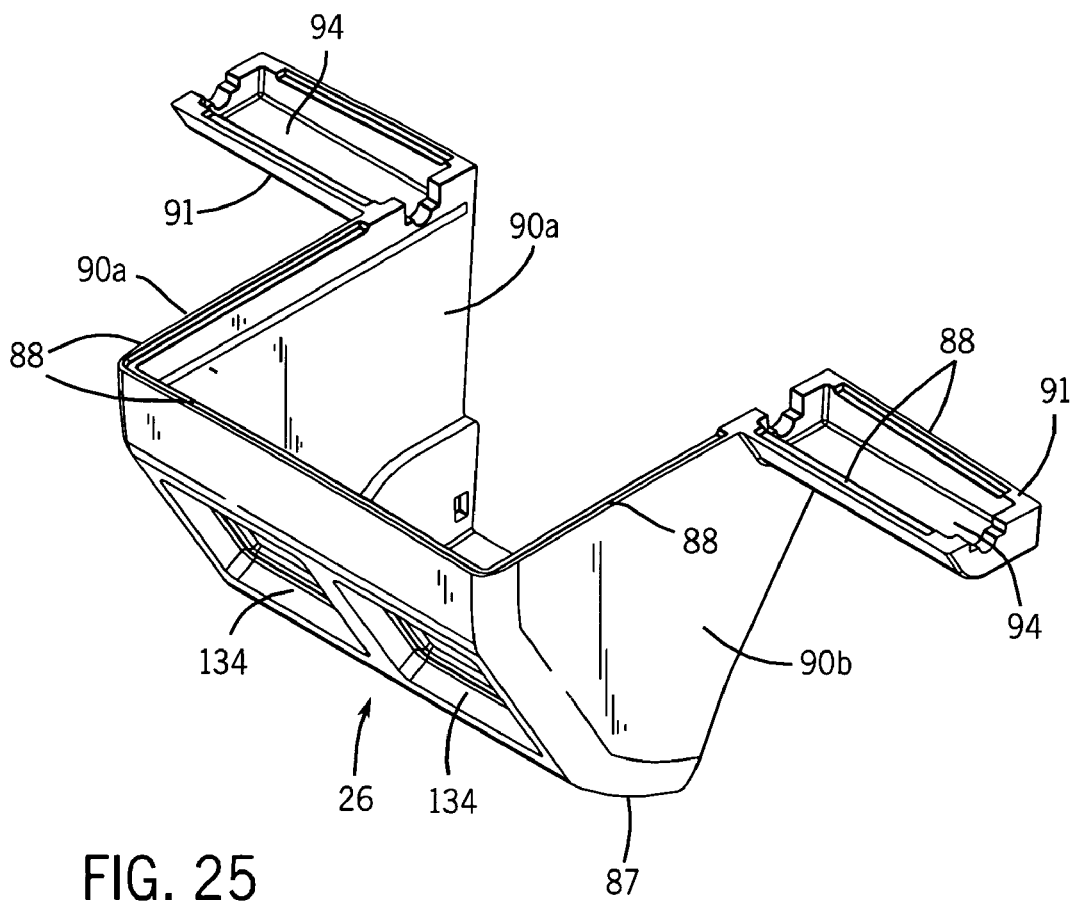
FIG. 25 is an isometric view of the receptacle member shown in FIG. 21, with the cover member removed.
Figure 26:
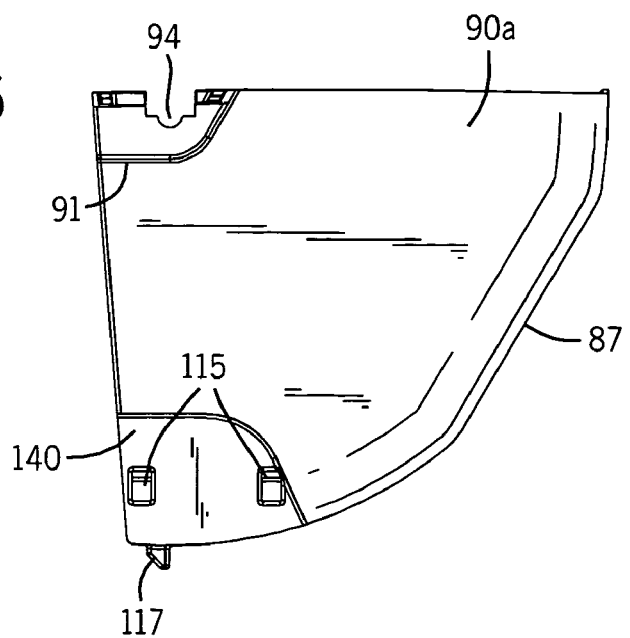
FIG. 26 is a left side elevation view of the receptacle member of FIG. 25.
Figure 27:
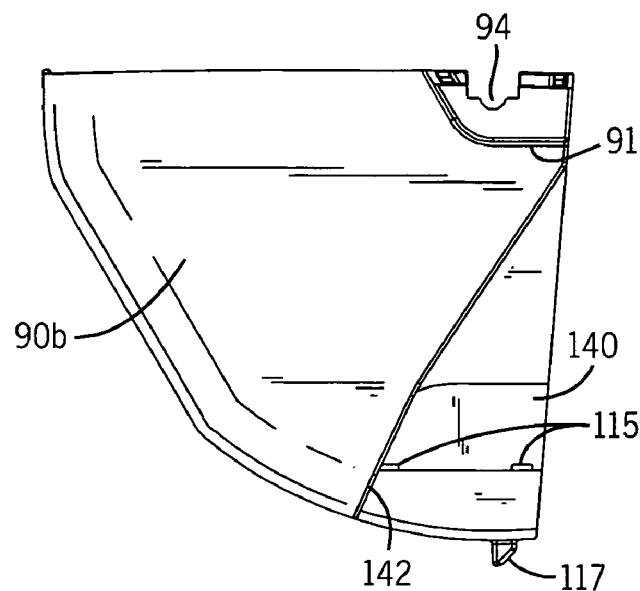
FIG. 27 is a right side elevation view of the receptacle member of FIG. 25.
Figure 28:
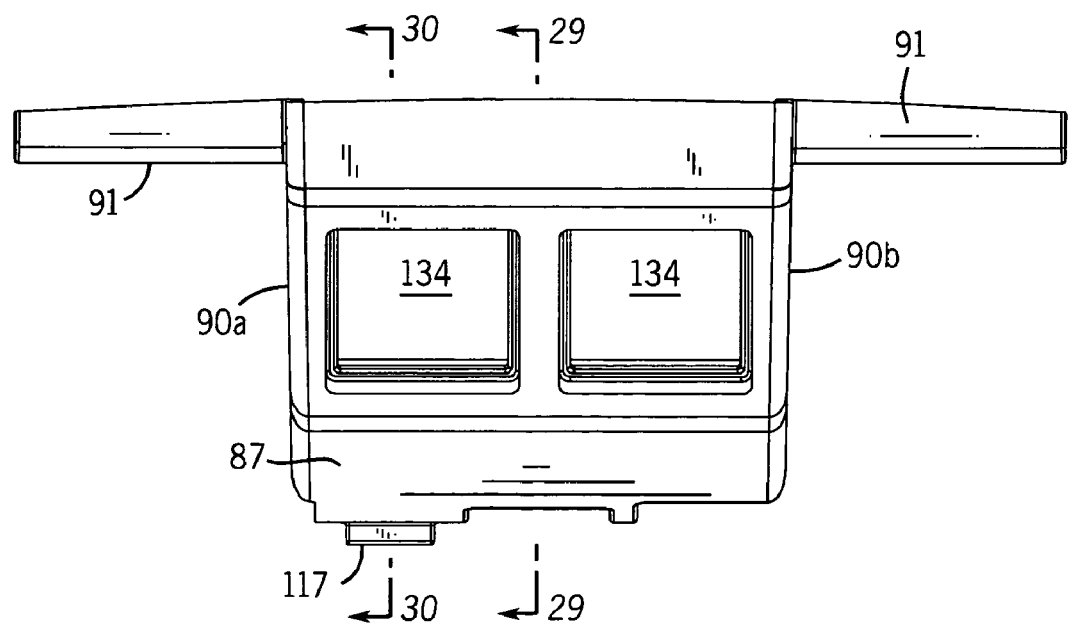
FIG. 28 is a front elevation view of the receptacle member of FIG. 25.
Figure 29:
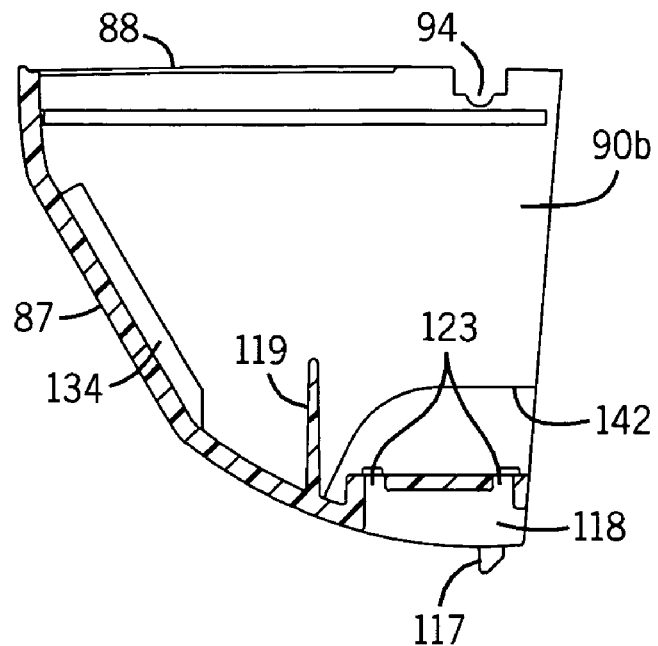
FIG. 29 is a cross-sectional view along line 29—29 of FIG. 28.
Figure 30:
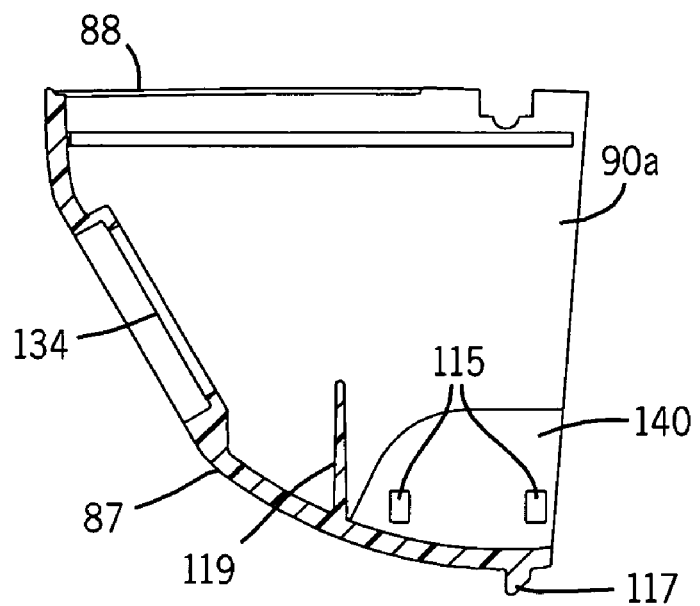
FIG. 30 is a cross-sectional view along line 30—30 of FIG. 28.
Figure 31:
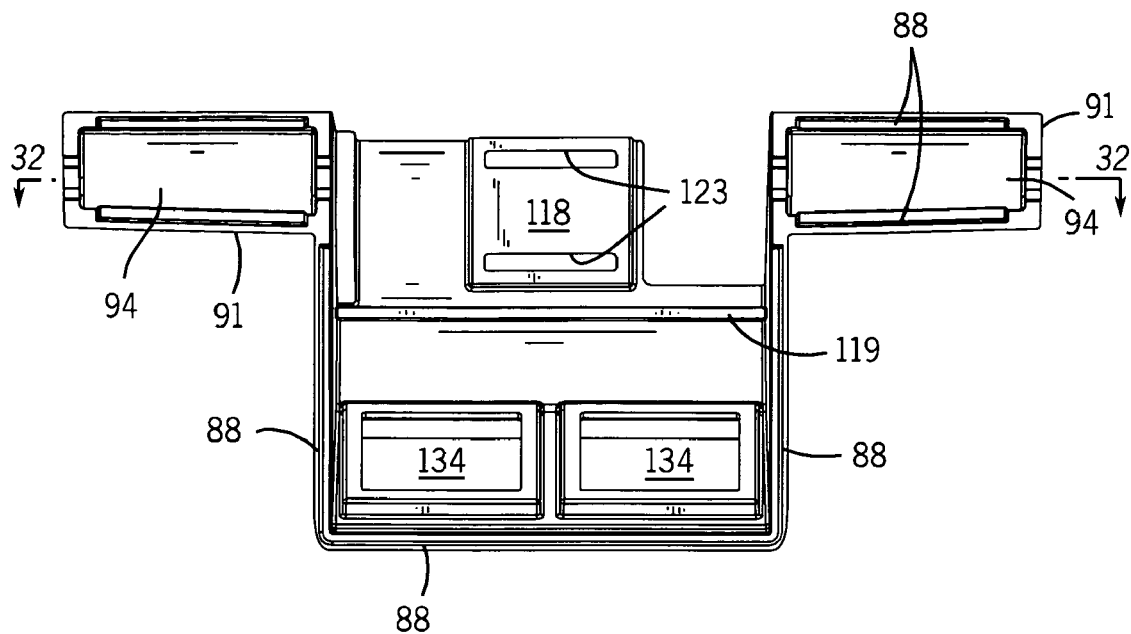
FIG. 31 is a top plan view of the receptacle member of FIG. 25.
Figure 32:
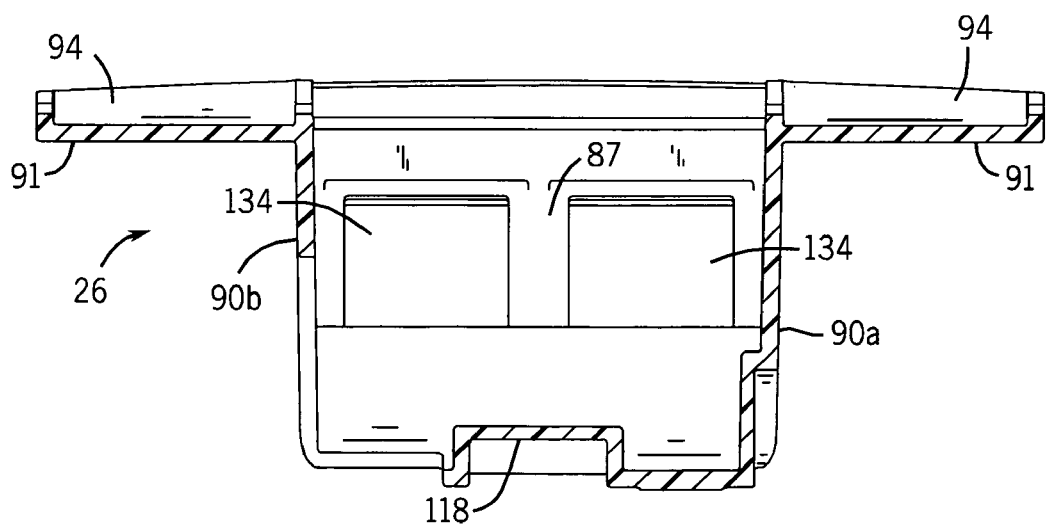
FIG. 32 is a cross-sectional view along line 32—32 of FIG. 31.
Figure 33:
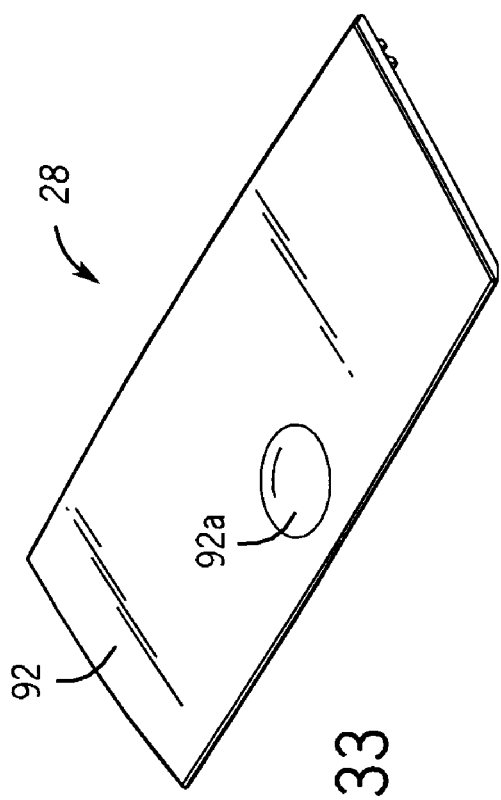
FIG. 33 is an isometric view of the cover member shown in FIG. 21, with the receptacle member removed.
Figure 34:
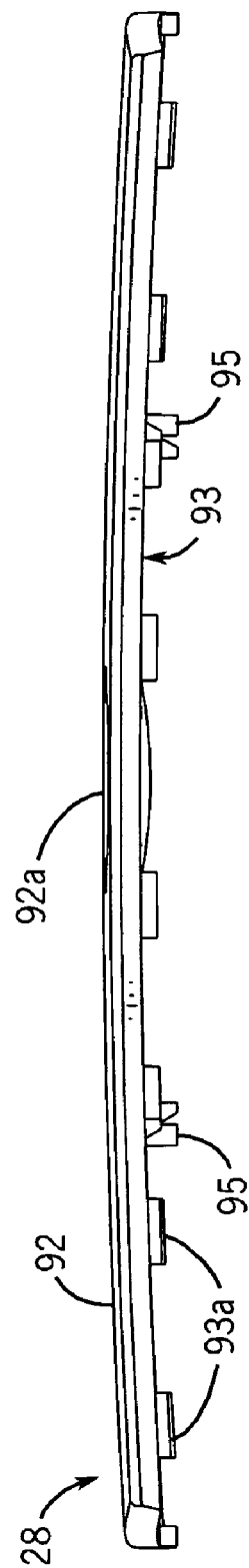
FIG. 34 is a front elevation view of the cover member of FIG. 33.
Figure 35:
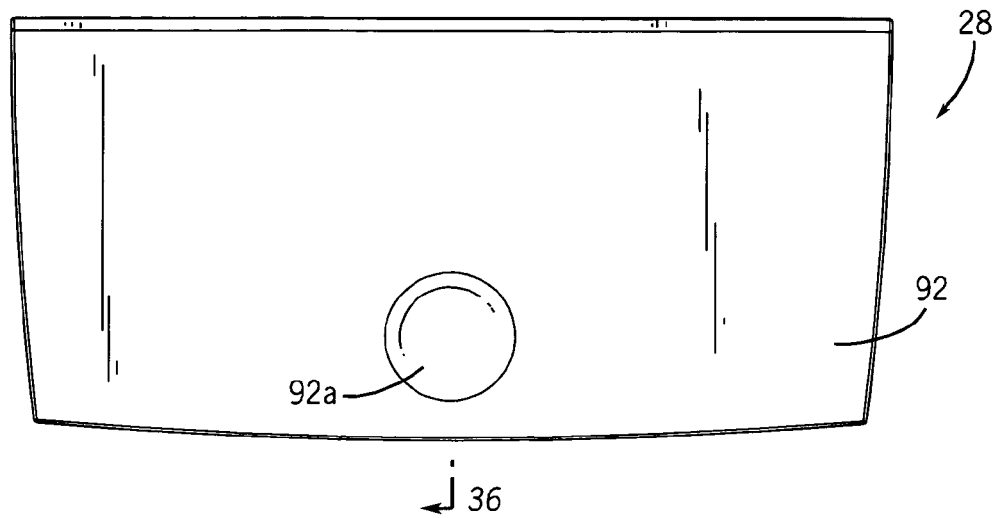
FIG. 35 is a top plan view of the cover member of FIG. 33.
Figure 36:
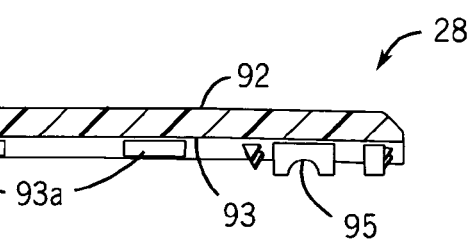
FIG. 36 is a cross-sectional view along line 36—36 of FIG. 35.
Figure 37:
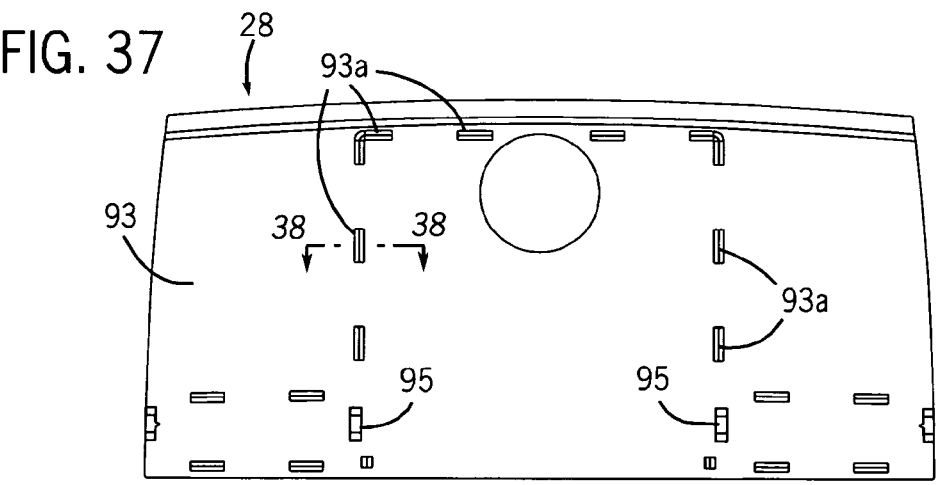
FIG. 37 is a bottom plan view of the cover member of FIG. 33.
Figure 38:
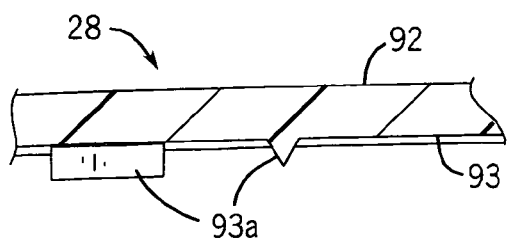
FIG. 38 is a cross-sectional view along line 38—38 of FIG. 37.
Figure 43:
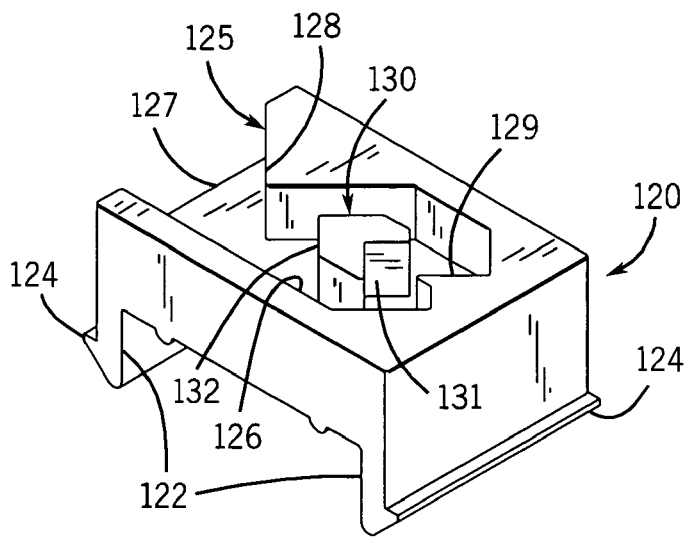
FIG. 43 is an isometric view of a latch incorporated into the utility receptacle assembly of FIG. 1.
Figure 44:
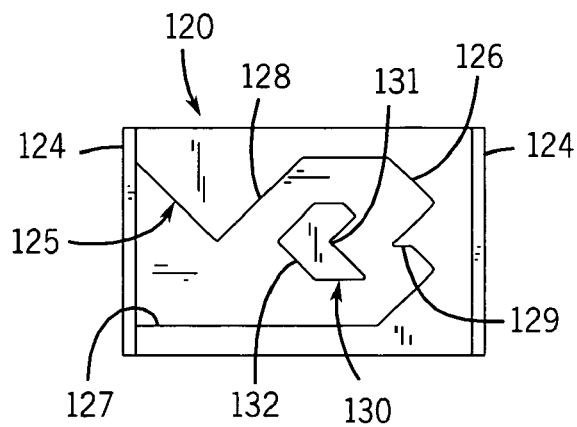
FIG. 44 is a top plan view of the latch of FIG. 44.
Figure 46:
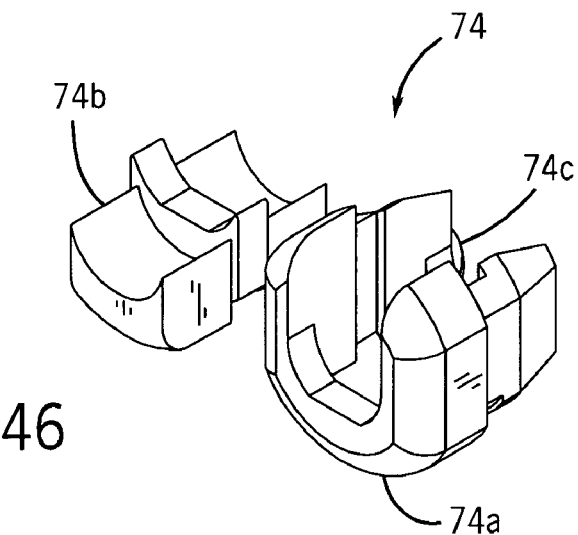
FIG. 46 is an isometric view of a cord grommet incorporated into the utility receptacle assembly of FIG. 1.

The central recess 44 is defined by a rear wall 62 that is formed as a downwardly extending extension of the side wall 34, a curved bottom wall 64 extending downwardly along an arcuate path from the side wall 32 to the bottom of the rear wall 62, and a pair of side walls 66 which extend between the rear wall 62, the bottom wall 64 and the respective upper surfaces 50 and 51 of each side recess 46 and 48. The rear wall 62 also includes a locking structure or tab 43 located generally opposite the locking member 40 on the side wall 32, to assist in securing the base member 24 to the support surface. One of the side walls 66 is positioned outwardly of the inner edge 67 of the adjacent upper surface 50, such that the upper surface 50 covers a small portion of one side of the central recess 44. The opposite side wall 66 includes an opening 68 adjacent the side wall 34 for receiving one end of a cord 70 having a plug 72 at the opposite end, which is used to supply power from a power source (not shown) to the utility receptacle assembly 20. The cord 70 encloses a number of separate wires 73 and is maintained within the opening 68 by a strain relief grommet 74 positioned within the opening 68 around the cord 70 and securely engaged therein. As best shown in FIGS. 8 and 46, the grommet 74 is formed of a pair of opposed portions 74a and 74b that are positionable around the cord 70 and are connected to one another by a leash 74c. A preferred construction for the grommet 74 is available from Heyco of Toms River, N.J. under part #SR 7P-2.

The central recess 44 also includes a channel 76 spaced adjacent the side recess 46 and extending outwardly from the interior surface 77 of the bottom wall 64. The channel 76 is generally rectangular in shape and extends from the rear wall 62 to a point adjacent the side wall 32. Opposite the rear wall 62, the channel 76 terminates at an opening 78 that includes an inwardly extending tab 80 disposed opposite the channel 76. While only one channel 76 and tab 80 are shown, it is also contemplated that more than one channel 76 and tab 80 can be formed in the base member 24 to provide a more stable positioning function, as will be described.

The central recess 44 further includes an abutment or stop 82 disposed approximately in the center of the interior surface 77 of the bottom wall 64 and spaced from the rear wall 62 and the channel 76. The stop 82 functions along with the channel 76 to assist in positioning and locking the receptacle member 26 of the assembly 20 in either the open or closed position in a manner to be described. The stop 82 is separated from the opening 68 by a partition 83 that ensures that the wires 73 extending into the base member 24 through the opening 68 do not extend over and interfere with the operation of the stop 82 in engaging the receptacle member 26.

As part of a mechanism used to control the movement of the receptacle member 26 with respect to the base member 24, the central recess 44 also includes an arcuate gear rack or strip 84 including a number of teeth 86 spaced along the length of the strip 84. The gear strip 84 is positioned against the side wall 66 under the inner edge 67 of the top surface 50, and extends along the interior surface 77 of the bottom wall 64 between the rear wall 62 and the top surface 50 of the side recess 46.

Referring now to FIGS. 1–8 and 16–32, the receptacle member 26 includes an arcuate bottom wall 87 that is generally complementary in shape to the curved bottom wall 64 of the base member 24, and a pair of side walls 90a and 90b positioned on opposite sides of the arcuate bottom wall 87. The bottom wall 87 and wide walls 90a and 90b define a generally open rear face 89 beneath the cover member 28. One of the side walls 90a has a recess 140 located opposite the cover member 28 and adjacent the rear face 89. The recess 140 includes a number of openings 115 that are used to mount a biased gear 110 to the side wall 90a, as will be described. The opposite wall 90b has a cut-out portion 142 disposed generally opposite the recess 140. The cut-out portion 142 enables the wires 73 from the cord 70 to be easily inserted into the receptacle member 26 and connected to receptacles 136 held within the receptacle member 26 without interfering with the movement of the receptacle member 26 with respect to the base member 24, resulting in smooth movement of the receptacle member 26 between an open and closed position within the base member 24. Each side wall 90a and 90b includes an extension 91 located opposite the arcuate wall 88 and extending outwardly perpendicularly from the side walls 90a and 90b. Extensions 91 are formed so that each defines a longitudinal sleeve-like recess 94, and recesses 94 are aligned with one another. A number of grooves 88 are positioned on the inner periphery of the upper edges of the arcuate wall 87, the side walls 90a and 90b, and the extensions 91 to enable the receptacle member 26 to be secured to the cover member 28 in a manner to be described. The arcuate wall 87 also includes a partition wall 119 that extends inwardly into the receptacle member 26 between the side walls 90a and 90b to assist in separating the parts of the assembly 20 contained within the receptacle member 26 from the parts disposed outside of the receptacle member 26.

Looking now at FIGS. 1–8, 16–24 and 33–38, the cover member 28 is relatively thin and has a top surface 92 and a bottom surface 93. The top surface 92 includes a generally circular depression 92a, and the bottom surface 93 has a number of downwardly extending elongate ridges 93a and a number of collars 95 having semi-circular recesses 95a formed therein. The ridges 93a are configured on the bottom surface 93 to be alignable with the grooves 88 in the upper end of the arcuate wall 87, side walls 90a and 90b, and the extensions 91 of the receptacle member 26. The ridges 93a can be secured in the grooves 88 in the receptacle member 26 in any conventional manner, such as by using an adhesive or sonic welding, for example, to hold the cover member 28 on the receptacle member 26. The cover member 28 is secured to the receptacle member 26 along the upper edges of the extensions 91, the side walls 90a and 90b and the arcuate wall 87 in order to form a unitary structure which can be mounted within the base member 24.

The recesses 94 in the extensions 91 of the receptacle member 26 and the recesses 95a in the collars 95 on the bottom surface 93 of the cover member 28 define a generally circular channel 96 between the receptacle member 26 and the cover member 28 in which is disposed a generally cylindrical pivot pin 98, best shown in FIGS. 1–8, 16–20 and 39–40. The pivot pin 98 extends completely through the receptacle member 26 to project outwardly from each of the extensions 91, such that the pivot pin 98 can be received within each of the bores 60 in the end walls 36 and 38 on opposite sides of the base member 24 in order to pivotally mount the receptacle member 26 and cover member 28 to the base member 24. Further, the pin 98 preferably includes an angled end portion 99 that functions to maintain the position of the pin 98 within the bores 60 by engaging the outer end of one of the extensions 91.

The pivot pin 98 also serves as a mounting point for a biasing member 100 disposed below the cover member 28 and connected within the receptacle member 26. The biasing member 100 is preferably a torsion spring 102 having a generally hollow cylindrical central section 104 disposed around the pivot pin 98, a first arm 106 extending outwardly from the central portion 104 and contacting the bottom surface 93 of the cover member 28, and a second arm 108 extending outwardly from the central portion 104 through the open rear face 89 of the receptacle member 26 and engaging the rear wall 62 of the central recess 44. The positioning of the torsion spring 102 around the pivot pin 98 operates to bias the receptacle member 26 and cover member 28 to a position where the receptacle member 26 is spaced partially outwardly from the base member 24. Additionally, while the preferred embodiment illustrated shows only one spring 102, other suitable biasing members can be utilized as well as additional springs 102.

Figure 47:
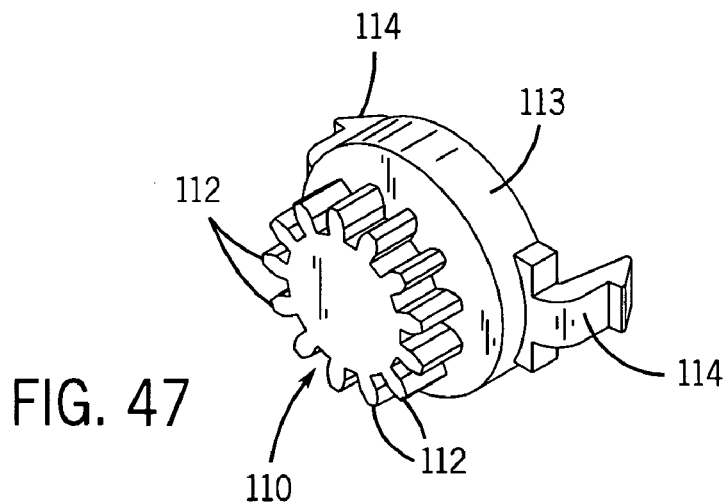
FIG. 47 is an isometric view of a gear and mount incorporated into the utility receptacle assembly of FIG. 1.
Figure 48:
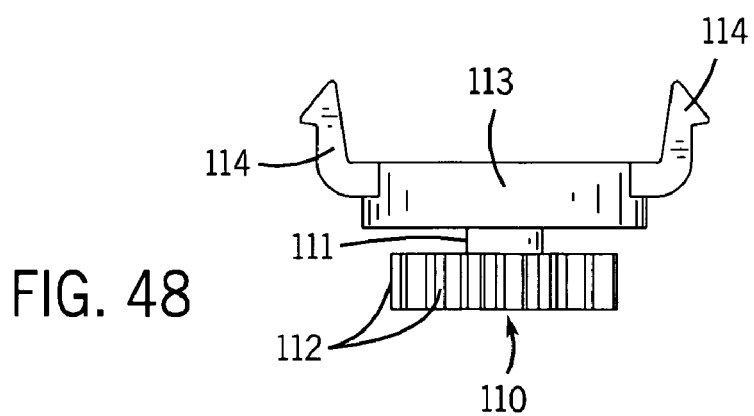
FIG. 48 is a side elevation view of the gear and mount of FIG. 47.

In order to control the speed and direction of the pivoting movement of the receptacle member 26 with respect to the base member 24, the receptacle member 26 further includes a gear 110 rotatably attached to the exterior of the side wall 90a. As best shown in FIGS. 47 and 48, the gear 110 includes a number of circumferentially-spaced teeth 112 that are engaged with the teeth 86 on the aforementioned gear strip 84 when the receptacle member 26 is mounted within the base member 24. The gear 110 is connected to a shaft 111 that is rotatably mounted to a resistance-applying mount 113 having arms 114 that are received within and engage the openings 15 in the recess 140 located on side wall 90a. The mount 113 is also maintained in position on the side wall 90a by stays 116 extending out from the side wall 90a and contacting the periphery of the mount 113. The mount 113 is a fluid-type rotary damper such as is available from ITW Delpro of Frankfort, Ill. under its part number 46-004321, although it is understood that any other satisfactory mechanism may be employed. Mount 113 thus allows the shaft 111 and gear 110 to rotate at only a predetermined speed with respect to the mount, such that the gear 110 can only move slowly along the gear strip 84 when the receptacle member 26 moves with respect to the base member 24 in response to the bias of the torsion spring 102. Thus, as the receptacle member 26 moves inwardly or outwardly with respect to the base member 24, the gear 110 rotates with respect to the mount 113 and moves along the gear strip 84 at the predetermined rate due to the resistance applied to the rotation of the shaft 111 and the gear 110 by the mount 113. This provides controlled movement of receptacle member 26 relative to base member 24, preventing the receptacle member 26 from moving too quickly during movement of receptacle member 26 and preventing damage to the base member 24 and receptacle member 26 which may otherwise be incurred from banging the receptacle member 26 against the base member 24. This arrangement of the gear strip 84 and gear 110 also effectively prevents the unintentional disengagement or misalignment of the receptacle member 26 from the base member 24.

In order to provide a limit for the maximum range of movement of the receptacle member 26 with respect to the base member 24, as best shown in FIGS. 8 and 16–32, the receptacle member 26 includes an outwardly extending projection 117 located on the arcuate wall 88 generally opposite the extensions 91. The projection 117 is preferably wedge-shaped and is positioned within the channel 76 on the curved bottom wall 64 of the base member 24 when the receptacle member 26 is mounted within the base member 24. As the receptacle member 26 is extended outwardly from the base member 24 due to the bias of the torsion spring 102, the projection 117 moves along the channel 76 until the projection 117 contacts and engages the tab 80 located on the base member 24 adjacent the upper ends of each channel 76. The engagement of the projection 117 with the tab 80 prevents any further movement of the receptacle member 26 relative to the base member 24, ensuring that the receptacle member 26 remains at least partially within the base member 24 so as not to expose the interior of the assembly 20. Further, in an alternative embodiment when the base member 24 includes more than one channel 76 and tab 80, the receptacle member 28 can include more than one projection 117, with each projection 117 positioned within an adjacent channel 76 and engageable with the associated tab 80.

Referring now to FIGS. 1–8, 16–32 and 43–44, in order to maintain the receptacle member 26 in a closed position within the base member 24 against the bias of the spring 102, the arcuate wall 87 further defines an inwardly extending recess 118 between the projections 117 and adjacent the partition wall 119 and in which is located a sliding latch 120. A preferred structure for the latch 120 is available from ITW Delpro of Frankfort, Ill. under its part number 46-005031, although it is understood that any other satisfactory structure may be employed as the latch 120. The latch 120 includes a number of upwardly extending arms 122 that include locking tabs 124 opposite the latch 120 that are used to secure the latch 120 within elongate slots 123 extending across the recess 118. The arms 122 attach the latch 120 to the recess 118 such that the latch 120 can slide along the elongate slots 123 disposed within the recess 118. This enables the latch 120 to selectively engage the stop 82 located on the interior surface 77 of the arcuate wall 64 in order to hold the receptacle member 26 within the base member 24. This selective locking of the receptacle member 26 within the base member 24 is accomplished by the locking structure 125 found on the latch 120. The locking structure 125 is formed on the latch 120 opposite the arms 122 and forms a downwardly extending, generally circular recess 126 formed in the latch 120 that includes an open end 127 located generally in alignment with the rear of the arcuate wall 87. The circular recess 126 also includes a neck 128 adjacent the open end 127 and a wedge 129 opposite the open end 127. The latch 120 also has a catch 130 spaced between the wedge 129 and the neck 128, and including a notch 131 adjacent the wedge 129 and an angled surface 132 opposite the notch 131. When the utility receptacle assembly 20 is in the closed position, the stop 82 is positioned within the notch 131 in the catch 130. When the receptacle member 26 and cover member 28 are pushed into the base member 24 against the bias of the springs 102, the stop 82 is moved out of the notch 131 and the catch 130 towards the wedge 129. With continued movement, the stop 82 contacts the wedge 129 and is diverted to one side or the other of the wedge 129. When the pressure on the receptacle member 26 and cover member 28 is released, the stop 82 can then move along the wall of the recess 126 past the neck 128 and out of the open end 127, enabling the receptacle member 26 to move out of the base member 24 under the bias of the spring 102. To lock the receptacle member 26 back within the base member 24, the receptacle member 26 and cover member 28 are pushed inwardly against the bias of the spring 102 so that the stop 82 reenters the latch 120 through the open end 127. The stop 82 is directed past the neck 128 and around the catch 130 by the angled surface 132 of the catch 130 and by the wall of the recess 126 to the wedge 129, which directs the stop 82 back into alignment with the notch 131. Thus, once the stop 82 is aligned with the notch 131 by the wedge 129, the receptacle member 26 can be released and the spring 102 will urge the stop 82 into the notch 131 to secure the receptacle member 26 within the base member 24. Further, the ability of the latch 120 to slide along the slots 123 allows the various surfaces of the latch 120 that engage the stop 82 to move when contacting the stop 82 in order to easily engage and disengage the stop 82 from the latch 120.

Figure 45:
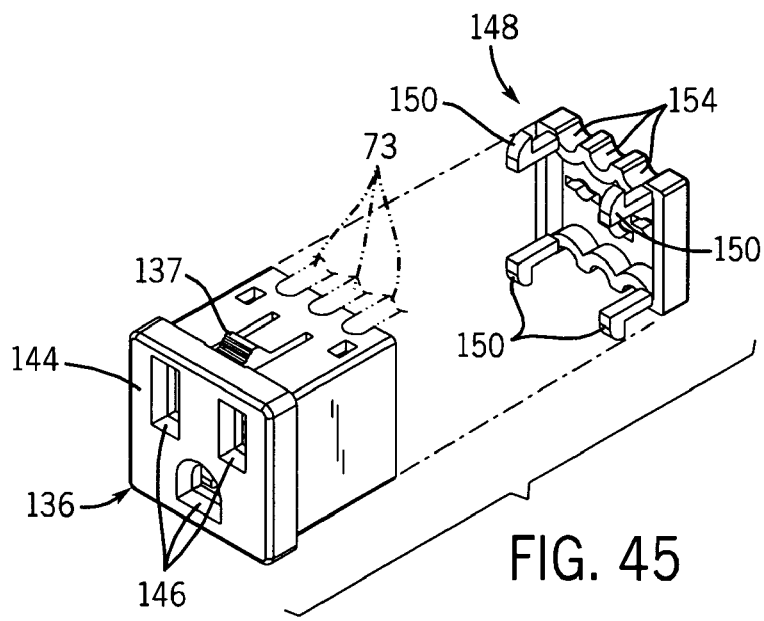
FIG. 45 is an isometric view of a power receptacle incorporated into the utility receptacle assembly of FIG. 1.

In the open position, a portion of the arcuate wall 87 of the receptacle member 26 is positioned above the base member 24 to expose a pair of receptacle openings 134 located in the arcuate wall 87 adjacent the cover member 28 and opposite the projections 117. Each of the openings 134 is adapted to receive therein a conventional power receptacle 136, best shown in FIG. 45. While any conventional receptacle 136 can be used, a preferred receptacle is manufactured by AMP of Harrisburg, Pa. under its part number 208979-2 and includes a main housing 144 having plug openings 146, and a cover 148 including mounting arms 150 and securable to the housing 144 opposite the opening 146. The wires 73 extending from the cord 70 are connected to terminals (not shown) disposed within the housing 144 and are held in position by inserting the wires 73 through recesses 154 on the cover 148 and then engaging the cover 148 with the housing 144. The receptacles 136 can be fixed within the opening 134 in any conventional manner, such as by biased tabs 137 disposed on opposite sides of the receptacle 136 and engageable with the opposed sides of the openings 134. As an alternative for one or both of the receptacles 136, the receptacle member 26 may include conventional data or communication ports or jacks (not shown) that are capable of receiving and engaging a standard communication connector, such as a telephone jack or the like. In this alternative, the wires 73 connected to the receptacle member 26 comprise both power wires and voice or data transfer wires to enable both power and voice or data signals to be distributed through the receptacle member 26. It is also contemplated that power supply receptacles such as 136 may be engaged within side openings 54, such that either power or communication connections may be on either or both of receptacle member 26 and base member 24.

The various components of the assembly 20 are each formed of a generally rigid material, such as a hard plastic or composite material, which enables the components to be easily made, such as by injection molding, to provide a durable and lightweight assembly 20.

Various embodiments and alternatives of the present invention are contemplated as being within the scope of the following claims, particularly pointing out and distinctly claiming the subject matter regarded as the invention.

I claim:

1. A utility receptacle assembly comprising:
   a) a base member adapted to be placed within an opening in a work surface, the base member defining a recess;
   b) a receptacle member pivotally connected to the base member within the recess and movable between an open position and a closed position, the receptacle member including at least one receptacle opening adapted to receive a receptacle therein;
   c) a biasing member engaged between the receptacle member and the base member to bias the receptacle member to the open position; and
   d) a latch arrangement for selectively maintaining the receptacle member in the closed position, wherein the latch arrangement includes a stop member on one of the base member and the receptacle member, and a movable latch member that is slidably mounted for lateral movement on the other of the base member and the receptacle member, wherein the latch member is laterally movable between a latching position in which the latch member is engaged with the stop member to maintain the receptacle member in the closed position, and a release position in which the latch member is disengaged from the stop member to enable movement of the receptacle member between the open and closed positions, and wherein the latch member includes a wedge member that is configured and arranged to engage the stop member and to move the latch member laterally from the latching position to the release position upon inward movement of the receptacle member from the closed position to enable the receptacle member to move outwardly to the open position under the influence of the biasing member.

2. The utility receptacle assembly of claim 1 wherein the biasing member comprises at least one torsion spring engaged between the receptacle member and the base member.

3. The utility receptacle assembly of claim 2 wherein the at least one torsion spring is mounted to a pivot pin rotatably secured to the base member and engaged with the receptacle member.

4. The utility receptacle assembly of claim 3 wherein the at least one torsion spring is mounted at least partially around the pivot pin.

5. The utility receptacle assembly of claim 1 wherein the latch member includes a recess defining a notch within which the stop member is engaged when the latch member is in the latching position.

6. The utility receptacle assembly of claim 5 wherein the member is disposed within the recess in the latch member.

7. The utility receptacle assembly of claim 1 further comprising a movement limiting assembly operably connected between the receptacle member and the base member and configured to limit the movement of the receptacle member with respect to the base member.

8. The utility receptacle assembly of claim 7 wherein the movement limiting assembly includes at least one tab disposed on one of the receptacle member or the base member and at least one flange disposed on the other of the receptacle member or the base member and engageable with the at least one tab.

9. The utility receptacle assembly of claim 1 further comprising a movement controlling assembly connected between the receptacle member and the base member and operable to limit the speed of movement of the receptacle member with respect to the base member.

10. A utility receptacle assembly comprising:
    a) a base member adapted to be placed within an opening in a work surface, the base member defining a central recess;
    b) a receptacle member pivotally connected to the base member within the central recess and movable between an open position and a closed position, the receptacle member including at least one receptacle opening adopted to receive a receptacle therein;
    c) a biasing member engaged between the receptacle member and the base member to bias the receptacle member to the open position; and
    d) a movement controlling assembly connected between the receptacle member and the base member and operable to limit the speed of movement of the receptacle member with respect to the base member, wherein the movement controlling assembly includes a damping member mounted to the receptacle member and engaged with the base.

11. The utility receptacle assembly of claim 10 further comprising a locking mechanism disposed on the receptacle member and engageable with the base member.

12. The utility receptacle assembly of claim 11 wherein the locking mechanism comprises a latch disposed on the receptacle member.

13. The utility receptacle assembly of claim 12 wherein the latch is slidably secured to the receptacle member.

14. The utility receptacle assembly of claim 10 wherein the damping member is a rotatable gear that is engaged with a toothed rail disposed on the base member.

15. A utility receptacle assembly for a work surface, the assembly comprising:

a) a base member adapted to be placed within an opening in a work surface, the base member including at least one upwardly facing stationary receptacle;

b) a movable receptacle member pivotally connected to the base member, the movable receptacle member including at least one receptacle, wherein the movable receptacle member is pivotable relative to the base member for movement between an open position in which the at least one receptacle is exposed and a closed position in which the at least one receptacle is concealed, wherein the movable receptacle member and the base member are configured such that the upwardly facing stationary receptacle of the base member and the at least one receptacle of the movable receptacle member are laterally offset from each other;

c) a biasing member disposed on the receptacle member and engaged with the base member to bias the receptacle member toward the open position; and d) a cover member carried by the receptacle member, wherein the cover member extends laterally from the receptacle member and is configured to overlie and conceal the upwardly facing stationary receptacle of the base member when the movable receptacle member is in the closed position.

16. The utility receptacle assembly of claim 15 further comprising a latch member disposed on one of the base member and the receptacle member and a stop member disposed on the other of the base member and the receptacle member, wherein the stop member is selectively engageable with the latch member to selectively maintain the receptacle member in the closed position.

17. The utility receptacle assembly of claim 15 wherein the receptacle member comprises:

a) a receptacle portion positioned within the base member, wherein the cover member is secured to the receptacle portion; and b) at least one pivot pin secured between the receptacle portion and the cover member and engaged with the base member.

18. The utility receptacle assembly of claim 17 wherein the biasing member is mounted to the at least one pivot pin.

19. The utility receptacle assembly of claim 15 further comprising a power cord extending through a cord opening in the base member and operably connected to the upwardly facing stationary receptacle.

20. A method for moving a utility receptacle from a concealed position to an exposed position, the method comprising the steps of:

a) providing a utility receptacle assembly including a base member positioned within an opening in the work surface, a receptacle member pivotally secured to the base member and including at least one receptacle thereon, a biasing member secured to the receptacle member and engaged with the base member, and a locking mechanism engaged between the receptacle member and the base member;

b) disengaging the locking mechanism;

c) allowing the biasing member to move the receptacle member out of the base member to expose the at least one; and d) limiting the speed of movement of the receptacle member with respect to the base member by operation of a damping member mounted to the receptacle member and engaged with the base member.

21. The method of claim 20 wherein the step of disengaging the locking mechanism comprises:

a) pressing the receptacle member towards the base member; and b) disengaging a stop on the base member from a latch on the receptacle member.

22. The method of claim 21 wherein the step of disengaging the stop from the latch comprises sliding the latch to enable the stop to move out of a recess on the latch.

23. The method of claim 20 further comprising the step of reengaging the locking mechanism after allowing the biasing member to move the receptacle member out of the base member.

* * * * *

UNITED STATES PATENT AND TRADEMARK OFFICE
CERTIFICATE OF CORRECTION

PATENT NO. : 6,979,209 B2
DATED : December 27, 2005
INVENTOR(S) : Dennis G. Griepentrog It is certified that error appears in the above-identified patent and that said Letters Patent is hereby corrected as shown below:

Column 10,
Line 18, after "the" (2nd occurrence) insert -- wedge --;

Column 12,
Line 19, after "one" and before ";" insert -- receptacle --.

Signed and Sealed this

Fourteenth Day of February, 2006

JON W. DUDAS
*Director of the United States Patent and Trademark Office*